(12) United States Patent
Gokan et al.

(10) Patent No.: US 8,450,983 B2
(45) Date of Patent: May 28, 2013

(54) SECONDARY CONTROL SYSTEM FOR MAINTAINING MOTOR GENERATOR POWER GENERATION DURING PRIMARY CONTROL FAILURE

(75) Inventors: Hiroshi Gokan, Chiyoda-ku (JP);
Naruki Suetake, Chiyoda-ku (JP);
Katsuya Tsujimoto, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 0 days.

(21) Appl. No.: 12/974,002

(22) Filed: Dec. 21, 2010

(65) Prior Publication Data
US 2012/0001597 A1      Jan. 5, 2012

(30) Foreign Application Priority Data
Jul. 2, 2010    (JP) ................................. 2010-151690

(51) Int. Cl.
*H02P 9/00*        (2006.01)
(52) U.S. Cl.
USPC ............................................. 322/20; 322/44
(58) Field of Classification Search
USPC ........................................................... 322/28
See application file for complete search history.

(56) References Cited

U.S. PATENT DOCUMENTS

| | | | | |
|---|---|---|---|---|
| 5,469,032 | A * | 11/1995 | Otake ....................... | 318/400.21 |
| 6,157,175 | A * | 12/2000 | Morinigo et al. ............... | 322/28 |
| 6,664,651 | B1 * | 12/2003 | Kotre et al. ...................... | 290/29 |
| 6,784,563 | B2 * | 8/2004 | Nada ........................... | 290/40 C |
| 6,959,237 | B2 * | 10/2005 | Ehrhart et al. .................. | 701/36 |
| 7,391,186 | B2 | 6/2008 | Asada | |
| 2003/0158638 | A1 * | 8/2003 | Yakes et al. ...................... | 701/22 |
| 2005/0087991 | A1 * | 4/2005 | Matsuoka ................... | 290/40 C |
| 2007/0085510 | A1 | 4/2007 | Asada | |
| 2010/0109324 | A1 * | 5/2010 | Ben-David et al. ............... | 290/8 |
| 2011/0266984 | A1 * | 11/2011 | Watanabe et al. ........ | 318/400.21 |

FOREIGN PATENT DOCUMENTS

| | | | |
|---|---|---|---|
| JP | 07-143604 | A | 6/1995 |
| JP | 2005-065403 | A | 3/2005 |
| JP | 2005-137065 | A | 5/2005 |
| JP | 2006-320178 | A | 11/2006 |
| JP | 2007-110871 | A | 4/2007 |
| JP | 2009-284564 | A | 12/2009 |

OTHER PUBLICATIONS

An Office Action (Notice of Rejection) from the Japanese Patent Office dated May 15, 2012, issued in corresponding Japanese Patent Application No. 2010-151690, with an English translation thereof.
Notice of Allowance (Decision of a Patent Grant) from Japanese Patent Office dated Jul. 24, 2012, issued in corresponding Japanese patent application No. 2010-151690, with English translation thereof.

* cited by examiner

*Primary Examiner* — Tulsidas C Patel
*Assistant Examiner* — S. Mikailoff
(74) *Attorney, Agent, or Firm* — Buchanan Ingersoll & Rooney PC

(57) ABSTRACT

A microcomputer that exercises driving control and power-generation control over a motor generator unit and a power-generation maintaining unit that, separately from the power-generation control exercised by the microcomputer, maintains a power-generation process performed by the motor generator unit are provided. While the microcomputer is operating normally, the power-generation maintaining unit allows the microcomputer to exercise the power-generation control. When an abnormality has occurred in the microcomputer, the power-generation maintaining unit acts as a backup or secondary controller to maintain the power-generation process performed by the motor generator unit, in an autonomous manner independently of the microcomputer.

19 Claims, 14 Drawing Sheets

| R LOGIC ABNORMALITY | OK | OK | OK | OK | NG | NG | NG | NG |
|---|---|---|---|---|---|---|---|---|
| DETECT MICROCOMPUTER ABNORMALITY | OK | OK | NG | NG | OK | OK | NG | NG |
| R COMMUNICATION ABNORMALITY | OK | NG | OK | NG | OK | NG | OK | NG |
| OUTPUT TRIP | NONE | TRIP | NONE | NONE | TRIP | TRIP | TRIP | TRIP |

SECONDARY CONTROL SYSTEM FOR MAINTAINING MOTOR GENERATOR POWER GENERATION DURING PRIMARY CONTROL FAILURE

BACKGROUND OF THE INVENTION

1. Field of the Invention

The present invention relates to an electric power converting apparatus and particularly relates to a vehicular electric power converting apparatus used with a vehicular rotating motor installed in a vehicle such as an automobile.

2. Description of the Related Art

For vehicular rotating motors, a power element is used as a rectifying device so as to achieve higher efficiency. A rectifying method is used by which an electric power converting apparatus reduces losses caused by the rectifying device, the electric power converting apparatus including a power element and a power element driving signal generating unit that generates a signal to drive the power element.

Further, to generate a torque by changing the direction of the current flowing in a power element and to be able to address not only a power-generation process but also a driving process, a controlling method that causes a motor to perform more complicated operations than those realized in commonly-exercised motor control has also been known, the controlling method employing a high-performance microcomputer that has a high computation-processing speed and is able to accommodate a large number of interruptions and timers (see Japanese Patent Application Laid-open No. 2009-284564).

Also, another method has been proposed by which, in the case where the operations of a microcomputer that controls the driving power and the power-generation power of a motor generator are not stable, only minimal power-generation process is maintained, instead of stopping all the functions (see Japanese Patent Application Laid-open No. 2005-137065).

However, for the reason that, for example, high-performance microcomputers include a large-scale memory, it is extremely difficult to obtain a high-performance microcomputer that meets ambient-temperature conditions observed in a position very close to an internal-combustion engine where the vehicular electric power converting apparatus is installed. Thus, a problem arises where the substrate on which the high-performance microcomputer is mounted needs to have a cooling mechanism or needs to be positioned away from the vehicular electric power converting apparatus.

Also, the processing capabilities of microcomputers that meet the ambient-temperature conditions observed in a position very close to an internal-combustion engine where the vehicular electric power converting apparatus is installed are not so high. Thus, there is another problem where the performance levels of those microcomputers are not high enough to realize the operations that are more complicated than those realized in commonly-exercised motor control.

Further, it is necessary to maintain the power-generation process at all times other than when actively causing the motor generator to perform a driving operation. Thus, it is necessary to keep causing electric current of a certain level to flow in the rotor. In the case where a sudden change has occurred in the load (e.g., when the load suddenly becomes small while a power-generation process is being performed with a large load), the power element being used can be destroyed by a sudden rise in the voltage at a power generator terminal.

In the case where a microcomputer is used for monitoring the operation state of the power-generation process described above, a large load is imposed by the processing performed in the microcomputer. A large burden is created by, for example, a process of exercising control so as to turn on and off all the phases of the power element that is connected to a stator, according to the rotation position and the speed of the rotor.

In view of the circumstances described above, it is an object of the present invention to obtain an electric power converting apparatus that is able to improve the reliability level of the power-generation operation control while reducing the load of the processing performed by the microcomputer.

SUMMARY OF THE INVENTION

An electric power converting apparatus according to an aspect of the present invention includes: a microcomputer that, based on a rotor current and stator phase voltages of a motor generator, exercises driving control and power-generation control over the motor generator; and a power-generation maintaining unit that, separately from the power-generation control exercised by the microcomputer, maintains a power-generation process performed by the motor generator.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an electric power converting apparatus according to the present invention will be explained in detail below with reference to the drawings. The present invention is not limited to the exemplary embodiments.

Figure 1:
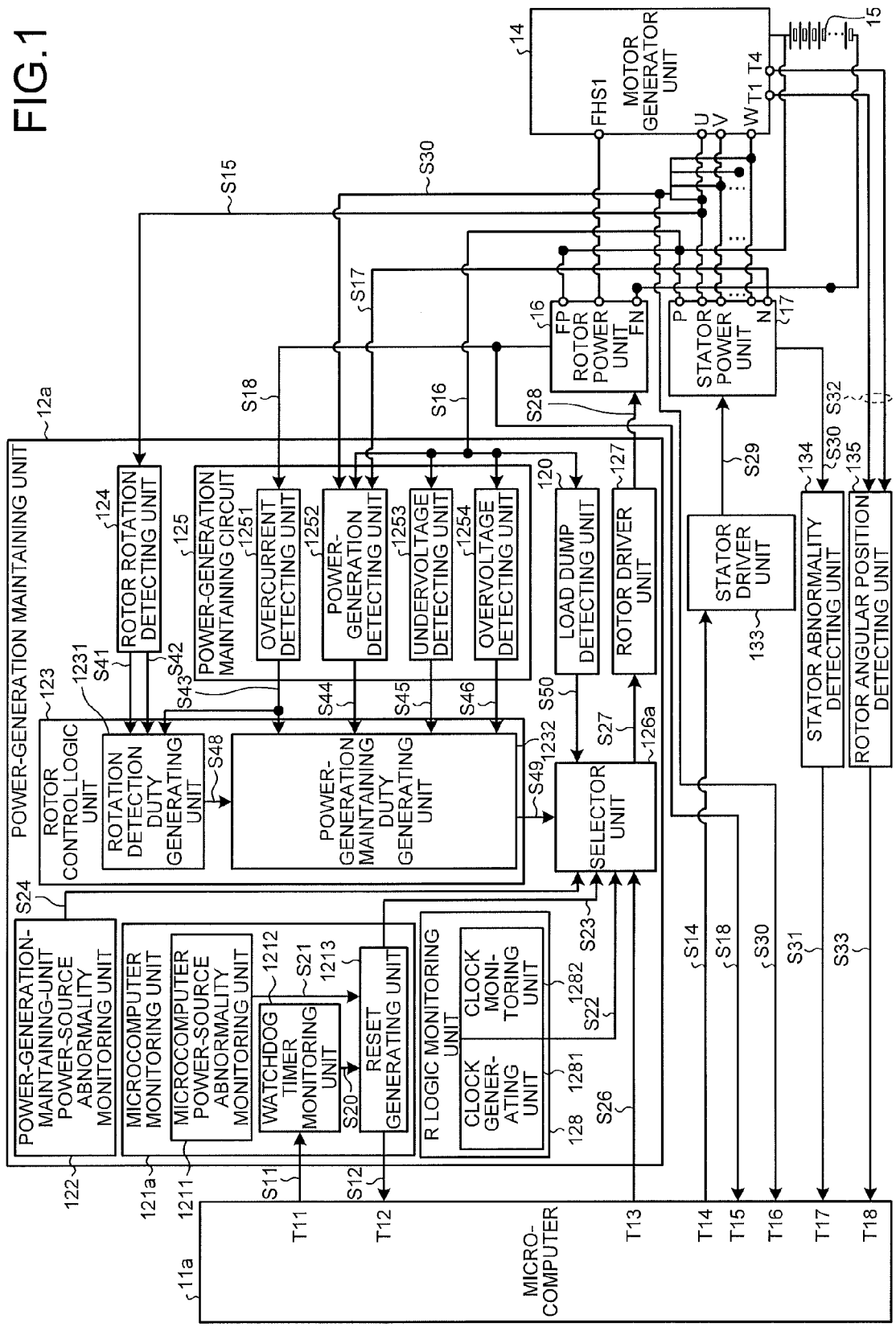
FIG. 1 is a schematic block diagram of an electric power converting apparatus according to a first embodiment of the present invention.

FIG. 1 is a schematic block diagram of an electric power converting apparatus according to a first embodiment of the present invention. As shown in FIG. 1, the electric power converting apparatus includes: a microcomputer 11a that exercises driving control and electric-power-generation control (hereinafter, "power-generation control") over a motor generator unit 14; and an electric-power-generation maintaining unit (hereinafter, "power-generation maintaining unit) 12a that maintains a power-generation process performed by the motor generator unit 14, separately from the power-generation control exercised by the microcomputer 11a.

The power-generation maintaining unit 12a is configured so as to allow the microcomputer 11a to exercise the power-generation control while the microcomputer 11a is operating normally and so as to maintain the power-generation process performed by the motor generator unit 14, in an autonomous manner independently of the microcomputer 11a in the case where an abnormality has occurred in the microcomputer 11a.

Further, the power-generation maintaining unit 12a is configured so as to, independently of the microcomputer 11a, monitor fluctuations in the load, based on a stator bus voltage and so as to block a rotor current in the motor generator unit 14 based on a result of the monitoring on the fluctuations in the load.

The microcomputer 11a includes: a port output terminal T11 from which a watch dog timer (WDT) signal S11 is output; a reset terminal T12 that receives, as an input, a reset signal S12; a pulse width modulation (PWM) output terminal T13 from which a microcomputer rotor gate signal S26 is output; a PWM output terminal T14 from which a stator gate command signal S14 is output; an analog input terminal T15 that receives, as an input, a rotor current monitor signal S18; an analog input terminal T16 that receives, as an input, a stator phase voltage monitor signal S30; a port input terminal T17 that receives, as an input, a stator power unit abnormality signal S31; and a port input terminal T18 that receives, as an input, a rotor angular position signal S33.

The power-generation maintaining unit 12a includes a microcomputer monitoring unit 121a, a power-generation-maintaining-unit power-source abnormality monitoring unit 122; a rotor control logic unit 123; a rotor rotation detecting unit 124; a power-generation maintaining circuit 125; a selector unit 126a; a rotor driver unit 127; a rotor logic monitoring unit 128; and a load dump detecting unit 120.

The power-generation maintaining circuit 125 is configured to monitor a power-generation state of the motor generator unit 14 based on stator phase voltages in the motor generator unit 14, so as to detect an overvoltage and an undervoltage during a power-generation process based on a stator bus voltage, and so as to detect an overcurrent based on a rotor current.

The microcomputer monitoring unit 121a includes a microcomputer power-source abnormality monitoring unit 1211, a watchdog timer monitoring unit 1212, and a reset generating unit 1213. The rotor control logic unit 123 includes a rotation detection duty generating unit 1231 and a power-generation maintaining duty generating unit 1232.

The power-generation maintaining duty generating unit 1232 is configured so as to, based on a result of the monitoring on the power-generation state performed by the power-generation maintaining circuit 125, control a duty so that the power-generation process performed by the motor generator unit 14 is maintained and so as to, in the case where an overvoltage has been detected during a power-generation process performed by the motor generator unit 14, control the duty so that rotations of the motor generator unit 14 are maintained.

The power-generation maintaining circuit 125 includes an overcurrent detecting unit 1251, a power-generation detecting unit 1252, an undervoltage detecting unit 1253, and an overvoltage detecting unit 1254. The rotor logic monitoring unit 128 includes a clock generating unit 1281 and a clock monitoring unit 1282.

Further, the electric power converting apparatus includes a rotor power unit 16, a stator power unit 17, a stator driver unit 133, a stator abnormality detecting unit 134, and a rotor angular position detecting unit 135.

Figure 2:
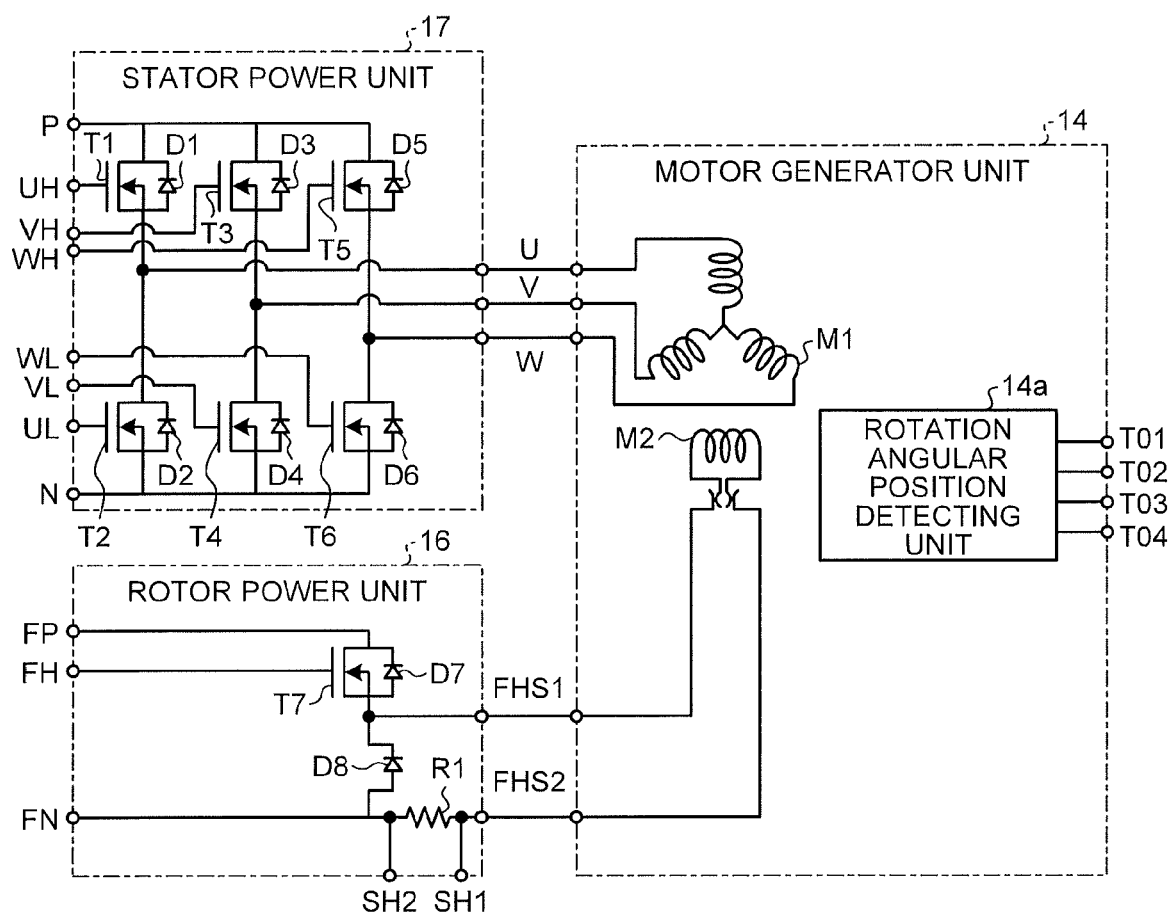
FIG. 2 is a schematic block diagram of a motor generator unit, a rotor power unit, and a stator power unit that are shown in FIG. 1.

FIG. 2 is a schematic block diagram of the motor generator unit 14, the rotor power unit 16, and the stator power unit 17 that are shown in FIG. 1. As shown in FIG. 2, the motor generator unit 14 includes amateur coils M1 and a field coil M2. The amateur coils M1 are provided in correspondence with three phases (i.e., a U-phase, a V-phase, and a W-phase). One end of each of the phases of the amateur coils M1 is connected to a corresponding one of input terminals U, V, and W, whereas the other ends of the three phases of the amateur coils M1 are connected together. The two ends of the field coil M2 are connected to input terminals FHS1 and FHS2, respectively.

The motor generator unit 14 includes a rotation angular position detecting unit 14a that detects a rotation angular position of the rotor. The rotation angular position detecting unit 14a is connected to output terminals TO1 to TO4.

The stator power unit 17 includes switching elements T1 to T6 and free wheel diodes D1 to D6. The free wheel diodes D1 to D6 are connected to the switching elements T1 to T6 in parallel. For example, a field effect transistor, a bi-polar transistor, or an Insulated Gate Bi-polar Transistor (IGBT) may be used for each of the switching elements T1 to T6.

A U-phase arm is formed by connecting the switching elements T1 and T2 in series. In addition, a V-phase arm is formed by connecting the switching elements T3 and T4 in series. Also, a W-phase arm is formed by connecting the switching elements T5 and T6 in series.

Further, the U-phase arm, the V-phase arm, and the W-phase arm are connected to one another in parallel. The two ends of each of the U-phase, the V-phase, and the W-phase arms are connected to power-source terminals P and N, respectively. The power-source terminal P is connected to the positive electrode side of a storage battery 15, whereas the power-source terminal N is connected to the negative electrode side of the storage battery 15. Further, a P-terminal voltage and an N-terminal voltage can be supplied to the power-source terminals P and N, respectively, as stator bus voltages.

Further, the gates of the switching elements T1 to T6 are connected to gate driving terminals UH, UL, VH, VL, WH, and WL, respectively. The connection point between the switching elements T1 and T2 is connected to the input terminal U, whereas the connection point between the switching elements T3 and T4 is connected to the input terminal V, while the connection point between the switching elements T5 and T6 is connected to the input terminal W.

The rotor power unit 16 includes a switching element T7, a free wheel diode D7, a diode D8, and a resistor R1. The free wheel diode D7 is connected to the switching element 7 in parallel. Further, the diode D8 is connected to the switching element T7 in series. The two ends of this serial circuit are connected to power-source terminals FP and FN, respectively. The power-source terminal FP is connected to the positive electrode side of the storage battery 15, whereas the power-source terminal FN is connected to the negative electrode side of the storage battery 15.

Further, the gate of the switching element T7 is connected to a gate driving terminal FH. The connection point between the switching element T7 and the diode D8 is connected to the input terminal FHS1. The resistor R1 is connected between the diode D8 and the input terminal FHS2, while the two ends of the resistor R1 are connected to detecting terminals SH1 and SH2, respectively.

Figure 3:
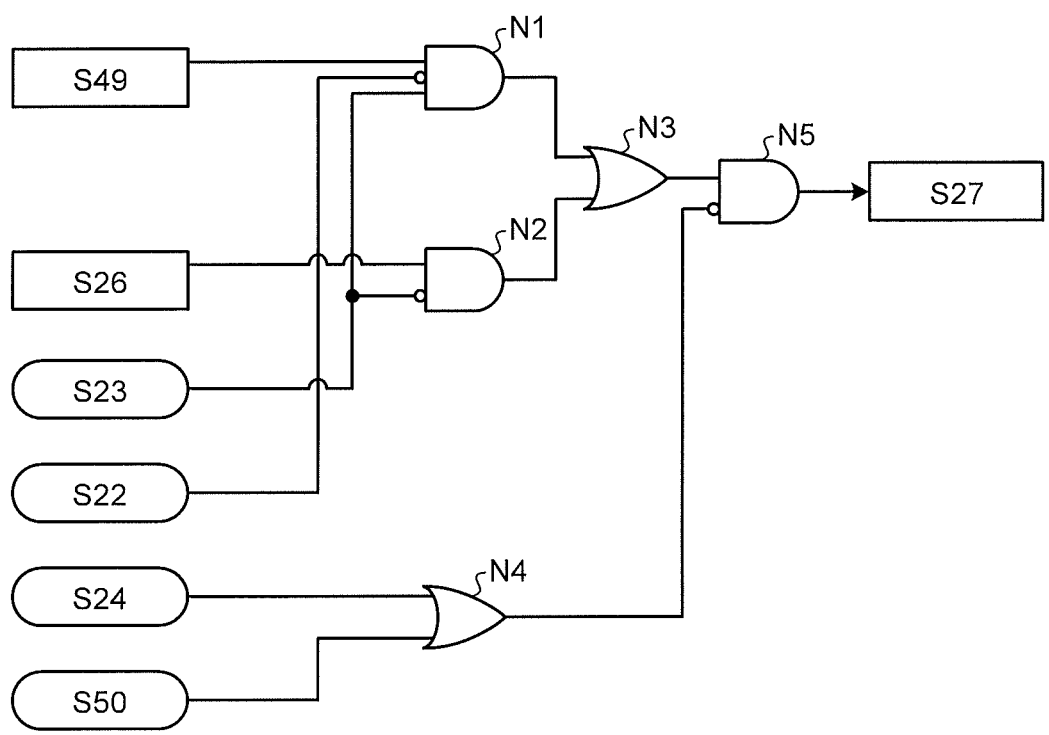
FIG. 3 is a schematic block diagram of a selector unit shown in FIG. 1.

FIG. 3 is a schematic block diagram of the selector unit 126a shown in FIG. 1. As shown in FIG. 3, the selector unit 126a includes logical AND circuits (i.e., logical product circuits) N1, N2, and N5, as well as logical OR circuits (i.e., logical sum circuits) N3 and N4. To the logical AND circuit N1, a power-generation maintaining duty signal S49 and a microcomputer abnormality detection signal S23 are input, and also, a rotor logic abnormality signal S22 is inverted and input.

To the logical AND circuit N2, the microcomputer rotor gate signal S26 is input, and also, the microcomputer abnormality detection signal S23 is inverted and input. To the logical OR circuit N3, output signals from the logical AND circuits N1 and N2 are input.

To the logical OR circuit N4, a rotor power-source abnormality signal S24 and a load dump detection signal S50 are input. To the logical AND circuit N5, an output signal from the logical OR circuit N3 is input, and also, an output signal from the logical OR circuit N4 is inverted and input. From the logical AND circuit N5, a rotor gate command signal S27 is output.

In the following sections, an operation performed by the electric power converting apparatus shown in FIG. 1 will be explained with reference to FIGS. 1 to 3.

The rotor current monitor signal S18 is output from the rotor power unit 16 via the detection terminals SH1 and SH2 and is input to the microcomputer 11a. Also, the stator phase voltage monitor signal S30 is detected from the input terminals U, V, and W and is input to the microcomputer 11a.

Further, a group of rotor angle detection signals S32 is output from the output terminals T1 to T4 and is input to the rotor angular position detecting unit 135. Subsequently, the rotor angular position signal S33 is generated from the group of rotor angle detection signals S32 by the rotor angular position detecting unit 135 and is input to the microcomputer 11a.

Also, the stator phase voltage monitor signal S30 is input to the stator abnormality detecting unit 134, so as to monitor occurrence of abnormalities in the stator power unit 17. In the case where an abnormality has occurred in the stator power unit 17, the stator power unit abnormality signal S31 is input to the microcomputer 11a.

Further, the microcomputer rotor gate signal S26 is generated by the microcomputer 11a based on the stator phase voltage monitor signal S30 and the rotor current monitor signal S18 and is input to the selector unit 126a. Also, the stator gate command signal S14 is generated based on the rotor angular position signal S33 and is input to the stator driver unit 133.

In addition, a stator gate drive signal S29 is generated from the stator gate command signal S14 by the stator driver unit 133 and is input to the stator power unit 17 via the gate driving terminals UH, UL, VH, VL, WH, and WL, so as to drive the switching elements T1 to T6.

Also, the WDT signal S11 is output from the microcomputer 11a into the watchdog timer monitoring unit 1212 so as to monitor a watchdog timer. In the case where an abnormality has occurred in the watchdog timer, a WDT abnormality detection signal S20 is output into the reset generating unit 1213.

Further, the microcomputer power-source abnormality monitoring unit 1211 monitors the power source of the microcomputer 11a. In the case where an abnormality has occurred in the power source of the microcomputer 11a, a microcomputer power-source abnormality detection signal S21 is output into the reset generating unit 1213.

Further, in the case where the reset generating unit 1213 has received, as an input, the WDT abnormality detection signal S20 or the microcomputer power-source abnormality detection signal S21, the reset signal S12 is output into the microcomputer 11a, and also, the microcomputer abnormality detection signal S23 is output into the selector unit 126a.

Further, the power-generation-maintaining-unit power-source abnormality monitoring unit 122 monitors the power source of the power-generation maintaining unit 12a. In the case where an abnormality has occurred in the power source of the power-generation maintaining unit 12a, the rotor power-source abnormality signal S24 is output into the selector unit 126a.

The clock monitoring unit 1282 monitors the clock of the power-generation maintaining unit 12a that has been generated by the clock generating unit 1281. In the case where an abnormality has occurred in the clock of the power-generation maintaining unit 12a, the rotor logic abnormality signal S22 is output into the selector unit 126a.

Also, a stator phase voltage monitor signal S15 is detected from one of the input terminals U, V, and W, and is input to the rotor rotation detecting unit 124. Further, the rotor rotation detecting unit 124 detects rotations of the rotor based on the stator phase voltage monitor signal S15 and outputs a rotation detection signal S41 and an induced voltage detection level signal S42 into the rotation detection duty generating unit 1231.

Further, when the rotation detection duty generating unit 1231 has received, as an input, the rotation detection signal S41, a rotation detection duty value instruction S48 is generated and is output into the power-generation maintaining duty generating unit 1232. The rotation detection duty value instruction S48 is able to set a duty value to a certain level so as to cause a rotor current to flow so that rotations are detectable.

The rotor current monitor signal S18 is output from the rotor power unit 16 into the overcurrent detecting unit 1251 so as to monitor the rotor current. In the case where an overcurrent has occurred in the rotor, an overcurrent detection signal S43 is output into the rotation detection duty generating unit 1231 and into the power-generation maintaining duty generating unit 1232.

Further, a P-terminal voltage S16, an N-terminal voltage S17, and the stator phase voltage monitor signal S30 are input to the power-generation detecting unit 1252 so as to monitor the power-generation state. In the case where the power-generation detecting unit 1252 has detected a state in which the power-generation process is being performed, a power-generation detection signal S44 is output into the power-generation maintaining duty generating unit 1232.

In addition, the P-terminal voltage S16 is input to the undervoltage detecting unit 1253 so as to monitor the stator bus voltage. In the case where the undervoltage detecting unit 1253 has detected an insufficiency in the stator bus voltage, an undervoltage detection signal S45 is output into the power-generation maintaining duty generating unit 1232.

Further, the P-terminal voltage S16 is input to the overvoltage detecting unit 1254 so as to monitor the stator bus voltage. In the case where the overvoltage detecting unit 1254 has detected an overvoltage in the stator bus voltage, an overvoltage detection signal S46 is output into the power-generation maintaining duty generating unit 1232.

When the rotation detection duty generating unit 1231 and the power-generation maintaining duty generating unit 1232 have received, as an input, the overcurrent detection signal S43, the rotation detection duty value instruction S48 and the power-generation maintaining duty signal S49 are blocked, and also, the switching element T7 is turned off, so that the rotor current is blocked.

As another example, in the case where the undervoltage detection signal S45 is output into the power-generation maintaining duty generating unit 1232, while the power-generation detection signal S44 is being output thereto, the power-generation maintaining duty signal S49 is generated therein and is output into the selector unit 126a so as to cause a rotor current to flow so that the power-generation process is maintained.

As yet another example, in the case where the overvoltage detection signal S46 is output into the power-generation maintaining duty generating unit 1232, while the power-generation detection signal S44 is being output thereto, the power-generation maintaining duty signal S49 is generated therein and is output into the selector unit 126a so as to cause a rotor current to flow so that rotations are detectable.

Further, the P-terminal voltage S16 is input to the load dump detecting unit 120 so as to monitor fluctuations in the load. In the case where a fluctuation in the load that exceeds a presumed level has been detected, the load dump detection signal S50 is generated and is output into the selector unit 126a.

Figure 4:
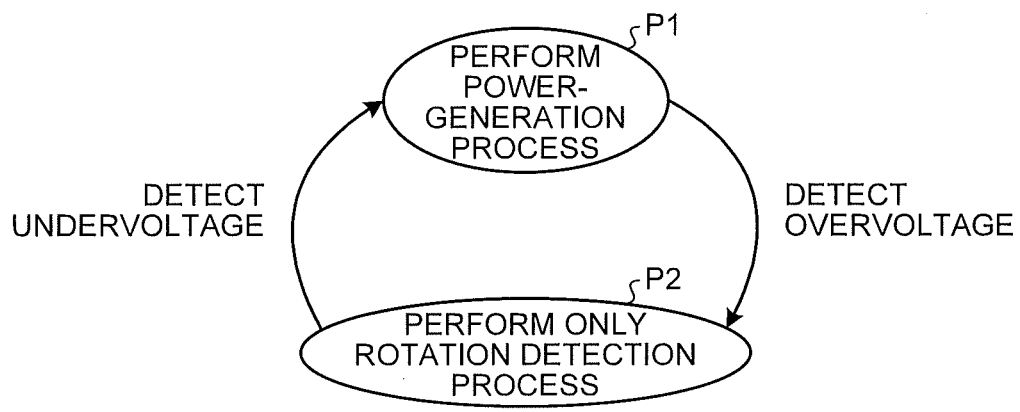
FIG. 4 is a drawing explaining state transitions of a power-generation maintaining duty generating unit shown in FIG. 1.

FIG. 4 is a drawing explaining state transitions of the power-generation maintaining duty generating unit 1232 shown in FIG. 1. As shown in FIG. 4, in the case where the undervoltage detecting unit 1253 has detected an undervoltage, the power-generation maintaining duty generating unit 1232 shifts into a power-generation state (P1) and generates the power-generation maintaining duty signal S49 so as to cause a rotor current to flow so that the power-generation process is maintained. It should be noted that the power-generation maintaining duty signal S49 in this situation is able to set the duty to a predetermined maximum duty value.

In contrast, in the case where the overvoltage detecting unit 1254 has detected an overvoltage, the power-generation maintaining duty generating unit 1232 shifts into a rotation detection state (P2) and generates the power-generation maintaining duty signal S49 so as to cause a rotor current to flow so that rotations are detectable. It should be noted that the power-generation maintaining duty signal S49 in this situation is able to set the duty according to the rotation detection duty value instruction S48.

Figure 5:
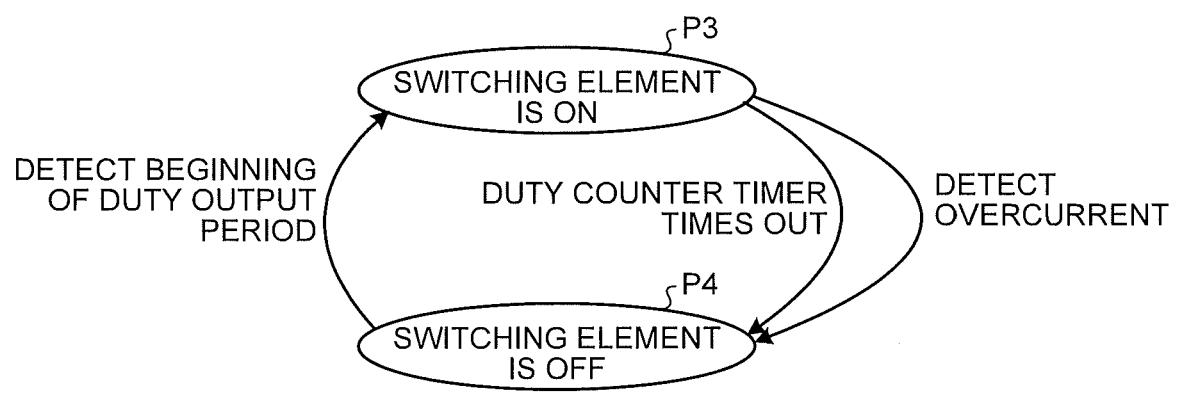
FIG. 5 is a drawing explaining state transitions of a rotation detection duty generating unit and the power-generation maintaining duty generating unit that are shown in FIG. 1, during a duty generating process.

FIG. 5 is a drawing explaining state transitions of the rotation detection duty generating unit 1231 and the power-generation maintaining duty generating unit 1232 that are shown in FIG. 1, during a duty generating process. As shown in FIG. 5, in the case where the overcurrent detecting unit 1251 has detected an overcurrent while the switching element T7 is in an ON state (P3), the duty is set to "0" by the power-generation maintaining duty signal S49 so that a transition is made into a state in which the switching element T7 is turned off (P4).

Further, when a duty counter timer has timed out while the switching element T7 is in an ON state (P3), the duty is set to "0" by the power-generation maintaining duty signal S49 so that a transition is made into a state in which the switching element T7 is turned off (P4).

Further, when the beginning of a time period of a duty output has been detected while the switching element T7 is in an OFF state (P4), a transition is made into the state in which the switching element T7 is turned on (P3).

Figure 6:
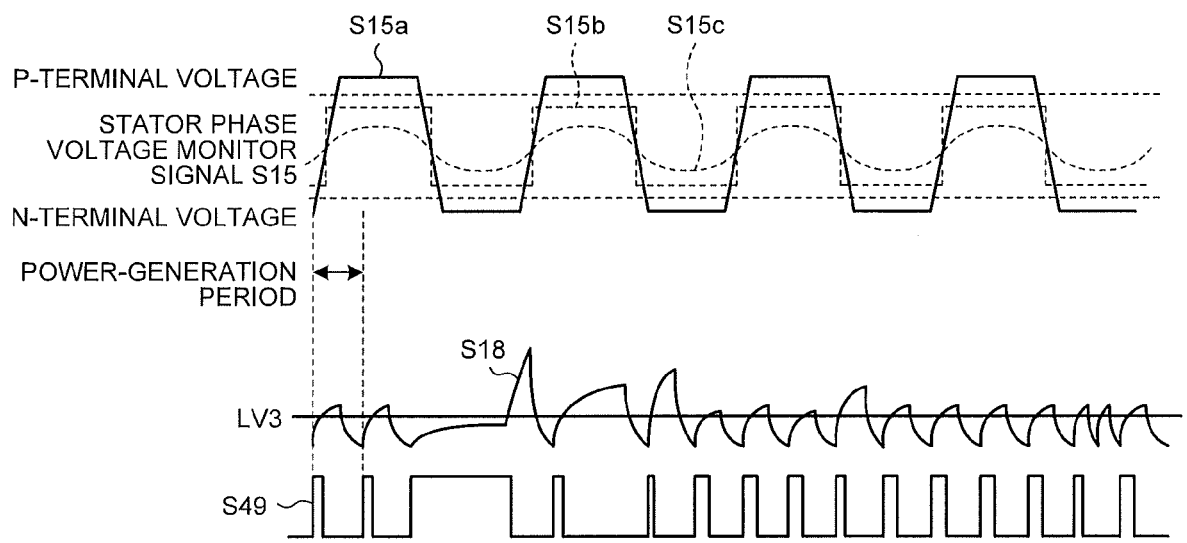
FIG. 6 is a timing chart explaining a controlling method to turn on and off a switching element when an overcurrent has been detected.

FIG. 6 is a timing chart explaining a controlling method to turn on and off the switching element T7 when an overcurrent has been detected. As shown in FIG. 6, during a power-generation period, the waveform of the stator phase voltage monitor signal S15 is shaped as S15a where the maximum level of the stator phase voltage monitor signal S15 is higher than the P-terminal voltage S16 by an amount corresponding to the forward-direction voltage of the free wheel diode D7, whereas the minimum level of the stator phase voltage monitor signal S15 is lower than the N-terminal voltage S17 by an amount corresponding to the forward-direction voltage of the free wheel diode D7.

In contrast, during a driving period the waveform of the stator phase voltage monitor signal S15 is shaped as S15b, whereas during a rotation detection period the waveform of the stator phase voltage monitor signal S15 is shaped as S15c. Thus, the level of the stator phase voltage monitor signal S15 stays within a range between the P-terminal voltage S16 and the N-terminal voltage S17. As a result, by having the rotor rotation detecting unit 124 monitor the waveform of the stator phase voltage monitor signal S15, it is possible to judge whether the power-generation process is being performed.

Further, the overcurrent detecting unit 1251 sets an overcurrent detection level LV3. In the case where the level of the rotor current monitor signal S18 has exceeded the overcurrent detection level LV3, the duty output of the power-generation maintaining duty signal S49 becomes "0", so that the switching element T7 is turned off. During one cycle of power-generation period, the overcurrent detection is valid only once, so that it is possible to turn on and off the switching element only once. The power-generation period may be different from the rotation detection period.

Figure 7:
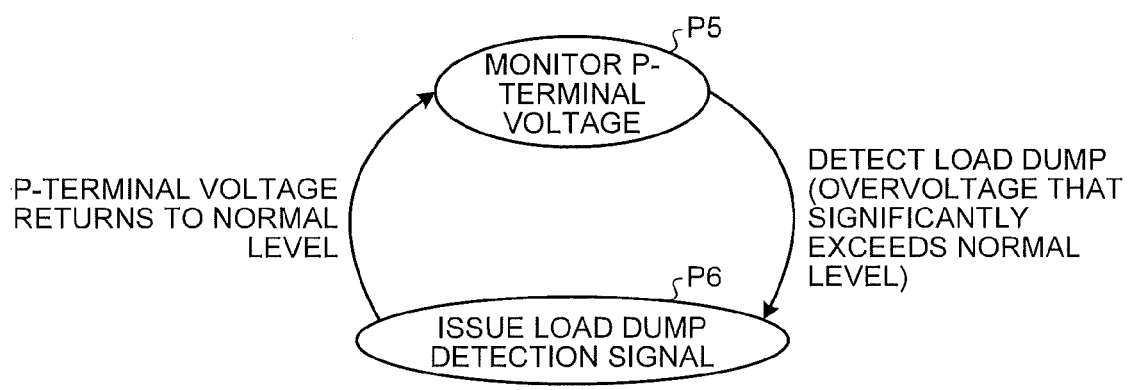
FIG. 7 is a drawing explaining state transitions of a load dump detecting unit shown in FIG. 1.

FIG. 7 is a drawing explaining state transitions of the load dump detecting unit 120 shown in FIG. 1. As shown in FIG. 7, in the case where a fluctuation in the load that exceeds the presumed level has been detected while the P-terminal voltage S16 is being monitored (P5), the load dump detection signal S50 is issued (P6). When an overvoltage that significantly exceeds the P-terminal voltage S16 at normal times has occurred, it is possible to assume that a fluctuation in the load that exceeds the presumed level has occurred. An overvoltage that significantly exceeds the P-terminal voltage S16 at normal times can be set, for example, in a range from approximately 30 volts to 50 volts.

If the P-terminal voltage S16 returns to the normal level after the load dump detection signal S50 has been issued, a transition is made into a state in which the P-terminal voltage S16 is being monitored (P5). The normal level of the P-terminal voltage S16 can be set to, for example, approximately 14 volts.

Further, in the case where the selector unit 126a has received, as an input, the rotor power-source abnormality signal S24 or the load dump detection signal S50, the microcomputer rotor gate signal S26 and the power-generation maintaining duty signal S49 are blocked, so that the duty is set to "0" by the rotor gate command signal S27.

In contrast, in the case where there is no abnormality in the power source of the rotor, there is no fluctuation in the load that exceeds the presumed level, and also, the power-generation maintaining unit 12a and the microcomputer 11a are operating normally, the microcomputer rotor gate signal S26 is selected by the selector unit 126a and is output as the rotor gate command signal S27.

As another example, in the case where there is no abnormality in the power source of the rotor, there is no fluctuation in the load that exceeds the presumed level, and the rotor logic abnormality signal S22 is input, the microcomputer rotor gate signal S26 is selected by the selector unit 126a and is output as the rotor gate command signal S27.

As yet another example, in the case where there is no abnormality in the power source of the rotor, there is no fluctuation in the load that exceeds the presumed level, and the microcomputer abnormality detection signal S23 is input, the power-generation maintaining duty signal S49 is selected by the selector unit 126a and is output as the rotor gate command signal S27.

The rotor gate command signal S27 that has been output from the selector unit 126a is input to the rotor driver unit 127. After that, a rotor gate drive signal S28 is generated from the rotor gate command signal S27 by the rotor driver unit 127 and is input to the rotor power unit 16 via the gate driving terminal FH.

With these arrangements, even in the case where an abnormality has occurred in the microcomputer 11a, the power-generation maintaining unit 12a is able to maintain the power-generation process performed by the motor generator unit 14. Thus, even under the ambient-temperature conditions observed in a position very close to an internal-combustion engine where the vehicular electric power converting apparatus is installed, it is possible to improve the reliability level of the power-generation process, in situations other than when the driving operation is actively performed.

In addition, because the power-generation maintaining unit 12a includes the load dump detecting unit 120, even in the case where the voltage has rapidly risen in a time period shorter than 100 microseconds due to a sudden change in the load of the motor generator unit 14, it is possible to promptly stop the power-generation operation in an extremely short time period and to block the rotor current. As a result, it is possible to prevent a delay caused by an overlap period between an interruption overhead period and another process in the microcomputer 11a and to make a responding process faster.

Further, because the power-generation maintaining unit 12a includes the rotor rotation detecting unit 124, even if the rotor current is not flowing, it is possible to detect the phase voltages induced from a residual magnetic flux remaining in the core member of the rotor and to detect the rotations of the rotor. As a result, once rotations of the rotor have been detected, it is possible to set the duty to a certain level so as to cause a rotor current to flow so that the rotations are maintained. Consequently, it is possible to detect the rotations of an engine or the like that is driven by the motor generator unit 14, without increasing the load of the microcomputer 11a.

Figure 8:
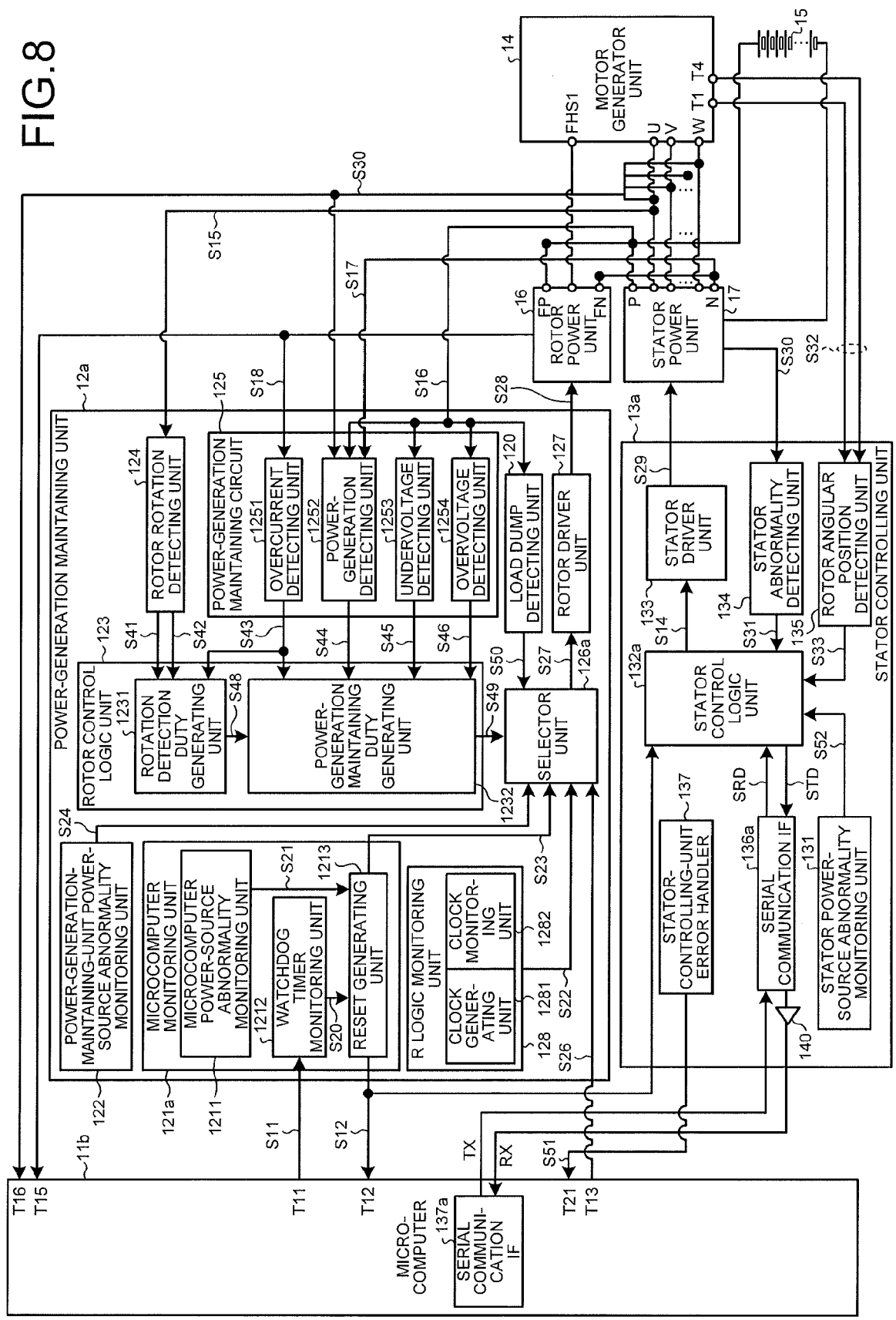
FIG. 8 is a schematic block diagram of an electric power converting apparatus according to a second embodiment of the present invention.

FIG. 8 is a schematic block diagram of an electric power converting apparatus according to a second embodiment of the present invention. As shown in FIG. 8, the electric power converting apparatus includes a microcomputer 11b instead of the microcomputer 11a shown in FIG. 1 and additionally includes a stator controlling unit 13a that exercises driving control over the stator, separately from the microcomputer 11b.

The microcomputer 11b includes the port output terminal T11, the reset terminal T12, the PWM output terminal T13, and the analog input terminals T15 and T16, as well as a stator interruption terminal T21. Further, the microcomputer 11b includes a serial communication interface (IF) 137a that transmits an operation instruction to the stator controlling unit 13a and receives information indicating an operation state of the stator from the stator controlling unit 13a.

The stator controlling unit 13a includes a stator power-source abnormality monitoring unit 131, a stator control logic unit 132a, the stator driver unit 133, the stator abnormality detecting unit 134, the rotor angular position detecting unit 135, a serial communication IF 136a, and a stator-controlling-unit error handler 137. Further, a buffer 140 is connected to an output terminal of the serial communication IF 136a.

In the following sections, an operation of the electric power converting apparatus shown in FIG. 8 will be explained. The operation performed by the power-generation maintaining unit 12a is the same as that in the electric power converting apparatus shown in FIG. 1.

In the stator controlling unit 13a, the group of rotor angle detection signals S32 is output from the output terminals T1 to T4 and is input to the rotor angular position detecting unit 135. Subsequently, the rotor angular position signal S33 is generated from the group of rotor angle detection signals S32 by the rotor angular position detecting unit 135 and is input to the stator control logic unit 132a.

The stator phase voltage monitor signal S30 is input to the stator abnormality detecting unit 134, so as to monitor occurrence of abnormalities in the stator power unit 17. In the case where an abnormality has occurred in the stator power unit 17, the stator power unit abnormality signal S31 is input to the stator control logic unit 132a.

Further, the stator power-source abnormality monitoring unit 131 monitors the power source of the stator controlling unit 13a. In the case where an abnormality has occurred in the power source of the stator controlling unit 13a, a stator power-source abnormality signal S52 is output into the stator control logic unit 132a. Also, a stator interruption signal S51 is output from the stator-controlling-unit error handler 137 into the microcomputer 11b.

By referring to the rotor angular position signal S33 as well as the stator phase voltage monitor signal S30 and a detection signal indicating the conduction state of the free wheel diodes D1 to D6 (i.e., whether the free wheel diodes D1 to D6 are turned on or off), the stator control logic unit 132a speculates the timing with which the switching elements T1 to T6 are turned on and off.

During a driving period, by referring to the rotor angular position signal S33, it is possible to cause the motor generator unit 14 to operate in a 180-degree conduction mode or in a 120-degree conduction mode, for example.

Further, when microcomputer transmission data TX has been transmitted from the microcomputer 11b, the microcomputer transmission data TX is received via the serial communication IF 136a. Further, stator reception data SRD is generated from the microcomputer transmission data TX by the serial communication IF 136*a* and is sent to the stator control logic unit 132*a*.

When stator transmission data STD has been transmitted from the stator control logic unit 132*a*, microcomputer reception data RX is generated by the serial communication IF 136*a* and is sent to the microcomputer 11*b*. It is acceptable that the serial communication is asynchronous.

The microcomputer transmission data TX may be a high-efficiency power-generation operation instruction, a power-running drive instruction, or a stop instruction and may include detailed parameter operation settings to realize these instructions. The microcomputer transmission data TX may include a register reading request for the purpose of checking the operation state of the stator.

The microcomputer reception data RX may include a response indicating whether the microcomputer transmission data TX has properly been received and been written into a register or a response to a register reading request from the microcomputer 11*b*.

In the case where a power-generation instruction or a drive instruction has been transmitted from the microcomputer 11*b*, the stator gate command signal S14 is generated by the stator control logic unit 132*a* and is input to the stator driver unit 133. After that, the stator gate drive signal S29 is generated from the stator gate command signal S14 by the stator driver unit 133 and is input to the stator power unit 17 via the gate driving terminals UH, UL, VH, VL, WH, and WL, so as to drive the switching elements T1 to T6.

Also, when the stator power-source abnormality signal S52 has been input to the stator control logic unit 132*a*, the stator gate command signal S14 is generated so as to turn off all of the switching elements T1 to T6.

Further, a case is considered in which the stator power unit abnormality signal S31 has been input to the stator control logic unit 132*a*. In the case where a short-circuit to the power source or a ground fault has occurred, the stator gate command signal S14 is generated so as to turn off all of the switching elements T1 to T6. In the case where an abnormality has occurred in an individual gate, the stator gate command signal S14 is generated so as to turn off a corresponding one of the switching elements T1 to T6 individually.

In the case where an abnormality has occurred in the stator, the stator interruption signal S51 is output from the stator-controlling-unit error handler 137 to the microcomputer 11*b*. After that, the microcomputer 11*b* transmits microcomputer transmission data TX in which an abnormality-purpose register reading request has been set, whereas the stator controlling unit 13*a* transmits microcomputer reception data RX in which an abnormality-purpose register value has been set.

In contrast, in the case where the reset generating unit 1213 has received, as an input, the WDT abnormality detection signal S20 or the microcomputer power-source abnormality detection signal S21, the reset signal S12 is output into the microcomputer 11*b* and into the stator control logic unit 132*a*. Also, the microcomputer abnormality detection signal S23 is output into the selector unit 126*a*.

Subsequently, the microcomputer 11*b* and the stator control logic unit 132*a* are reset, and also, the selector unit 126*a* switches the setting so that the power-generation process is maintained.

As a result, it is possible to realize synchronous rectification power-generation and driving, without the need to cause the microcomputer 11*b* to receive, as an input, the stator power unit abnormality signal S31 or the rotor angular position signal S33, and without the need to cause the microcomputer 11*b* to output the stator gate command signal S14. Thus, it is possible to reduce the load of the microcomputer 11*b*. Consequently, it is possible to use the microcomputer 11*b* that meets the ambient-temperature conditions observed in a position very close to an internal-combustion engine where the vehicular electric power converting apparatus is installed and to reduce the number of gate wirings. As a result, there is no need to provide a cooling mechanism for the microcomputer 11*b* or to position the microcomputer 11*b* away from the vehicular electric power converting apparatus. Consequently, it is possible to alleviate the restrictions related to the positional arrangement of the electric power converting apparatus and to reduce the mounting area of the electric power converting apparatus.

Figure 9:
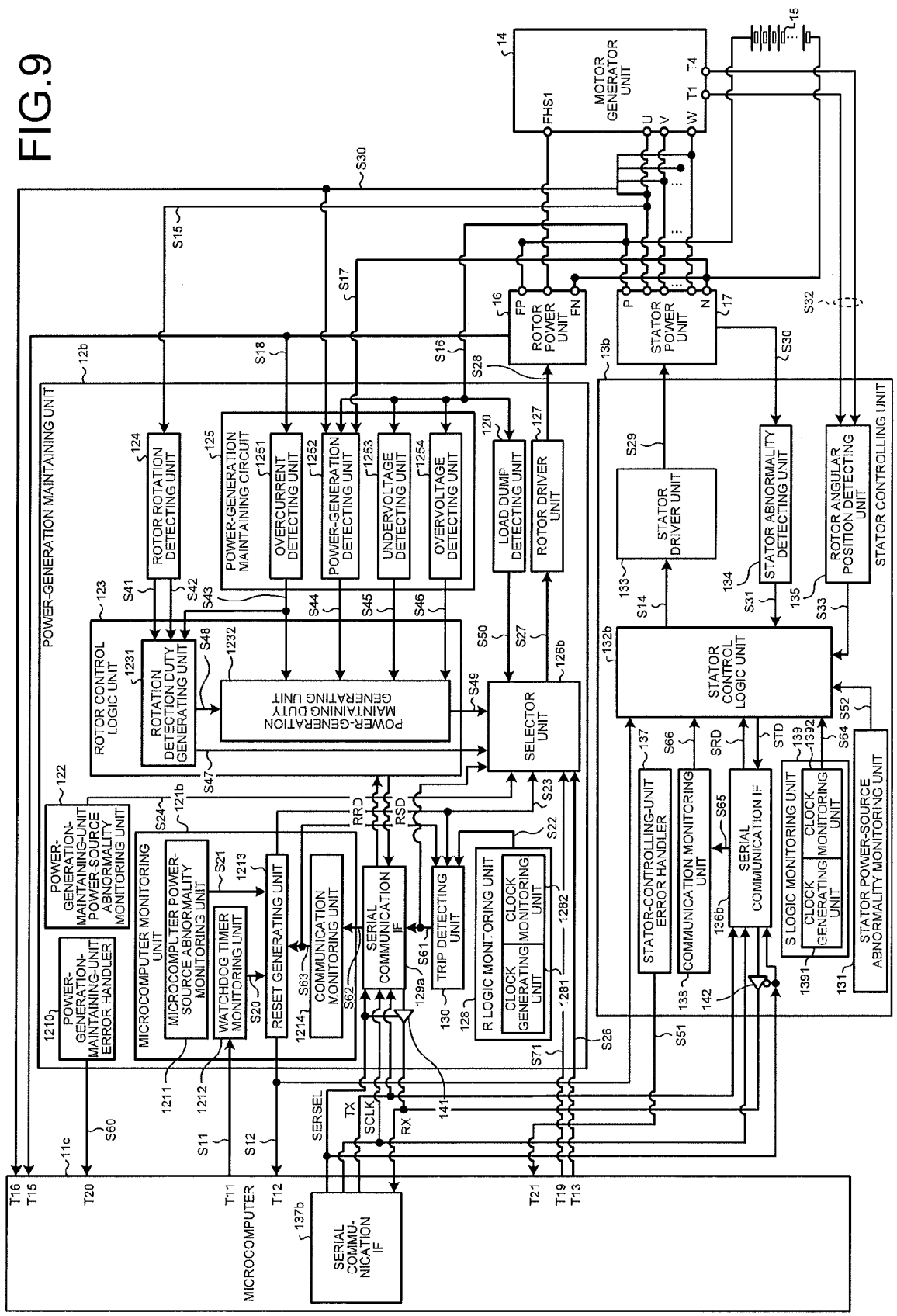
FIG. 9 is a schematic block diagram of an electric power converting apparatus according to a third embodiment of the present invention.

FIG. 9 is a schematic block diagram of an electric power converting apparatus according to a third embodiment of the present invention. As shown in FIG. 9, the electric power converting apparatus includes a microcomputer 11*c*, a power-generation maintaining unit 12*b*, and a stator controlling unit 13*b*, instead of the microcomputer 11*b*, the power-generation maintaining unit 12*a*, and the stator controlling unit 13*a* that are shown in FIG. 8.

The microcomputer 11*c* includes the port output terminal T11, the reset terminal T12, the PWM output terminal T13, and the analog input terminals T15 and T16, as well as a port output terminal T19. Further, the microcomputer 11*c* includes the stator interruption terminal T21 and a rotor interruption terminal T20. In addition, the microcomputer 11*c* includes a serial communication IF 137*b* that transmits an operation instruction to the stator controlling unit 13*b*, receives information indicating an operation state of the stator from the stator controlling unit 13*b*, and receives information indicating an operation state of the rotor from the power-generation maintaining unit 12*b*.

The power-generation maintaining unit 12*b* includes a microcomputer monitoring unit 121*b* and a selector unit 126*b*, instead of the microcomputer monitoring unit 121*a* and the selector unit 126*a* that are included in the power-generation maintaining unit 12*a* shown in FIG. 8. In addition, the power-generation maintaining unit 12*b* further includes a serial communication IF 129*a*, a trip detecting unit 130, a power-generation-maintaining-unit error handler 1210, and a buffer 141. The microcomputer monitoring unit 121*b* is formed by adding a communication monitoring unit 1214 to the microcomputer monitoring unit 121*a* shown in FIG. 1.

The stator controlling unit 13*b* includes a stator control logic unit 132*b* and a buffer 142, instead of the stator control logic unit 132*a* and the buffer 140 that are included in the stator controlling unit 13*a* shown in FIG. 8. In addition, the stator controlling unit 13*b* further includes a stator logic monitoring unit 139 and a communication monitoring unit 138. The stator logic monitoring unit 139 includes a clock generating unit 1391 and a clock monitoring unit 1392.

Figures 10, 11:
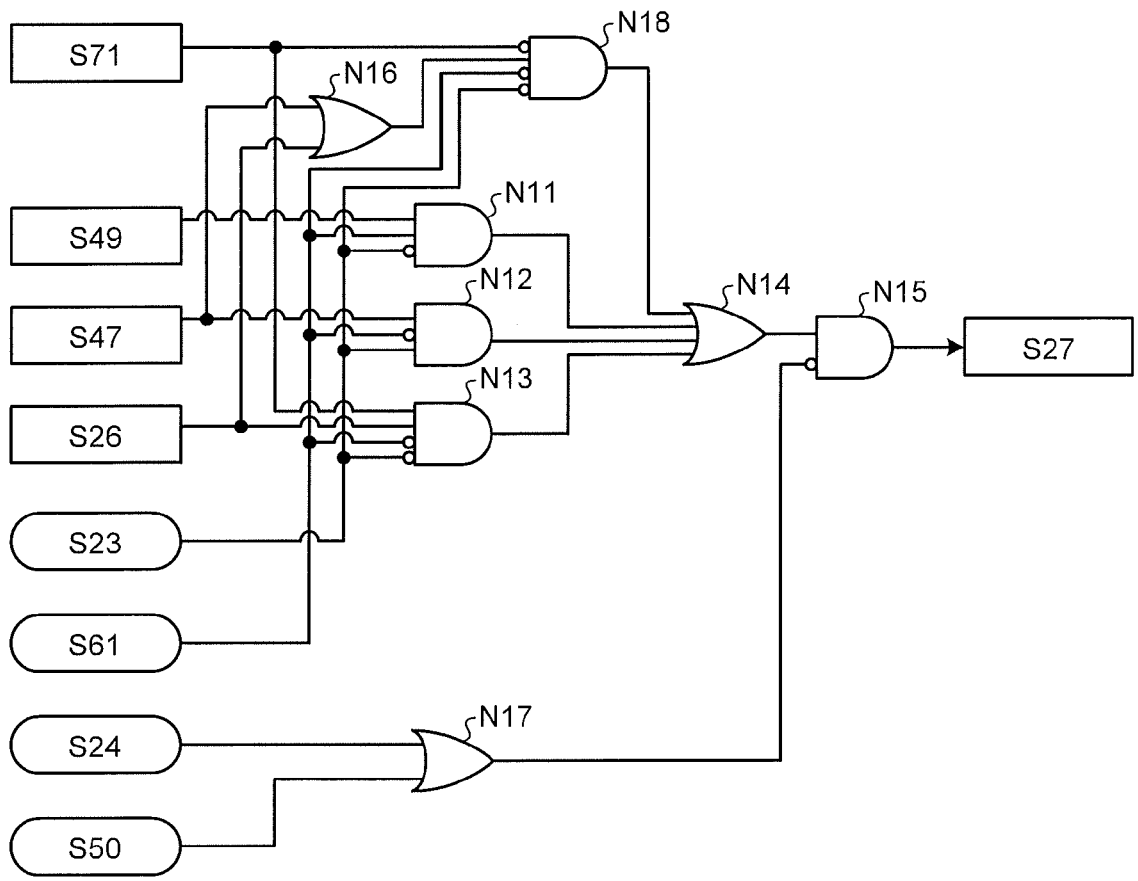
FIG. 10 is a schematic block diagram of a selector unit 126b shown in FIG. 9.
FIG. 11 is a table explaining an example of an operation performed by a trip detecting unit shown in FIG. 9.

FIG. 10 is a schematic block diagram of the selector unit 126*b* shown in FIG. 9. As shown in FIG. 10, the selector unit 126*b* includes logical AND circuits N11 to N13, N15, and N18 as well as logical OR circuits N14, N16, and N17. To the logical AND circuit N11, the power-generation maintaining duty signal S49 and a trip signal S61 are input, and also, the microcomputer abnormality detection signal S23 is inverted and input.

To the logical AND circuit N12, a rotation detection duty signal S47 and the microcomputer abnormality detection signal S23 are input, and also, the trip signal S61 is inverted and input. To the logical AND circuit N13, the microcomputer rotor gate signal S26 and a microcomputer power-generation/ driving switching signal S71 are input, and also, the microcomputer abnormality detection signal S23 and the trip signal S61 are inverted and input.

To the logical OR circuit N16, the microcomputer rotor gate signal S26 and the rotation detection duty signal S47 are input. To the logical OR circuit N17, the rotor power-source abnormality signal S24 and the load dump detection signal S50 are input.

To the logical AND circuit N18, an output signal from the logical OR circuit N16 is input, and also, the microcomputer power-generation/driving switching signal S71, the microcomputer abnormality detection signal S23, and the trip signal S61 are inverted and input.

To the logical OR circuit N14, output signals from the logical AND circuits N11 to N13 and N18 are input. To the logical AND circuit N15, an output signal from the logical OR circuit N14 is input, and also, an output signal from the logical OR circuit N17 is inverted and input. From the logical AND circuit N15, the rotor gate command signal S27 is output.

In the following sections, an operation performed by the electric power converting apparatus shown in FIG. 9 will be explained with reference to FIGS. 9 and 10.

In the stator controlling unit 13b, the clock of the stator controlling unit 13b that has been generated by the clock generating unit 1391 is monitored by the clock monitoring unit 1392. In the case where an abnormality has occurred in the clock of the stator controlling unit 13b, a stator logic abnormality signal S64 is output into the stator control logic unit 132b.

Further, from the microcomputer 11c, a communication synchronization-purpose clock signal SCLK is output into the serial communication IFs 129a and 136b. Even in the case where the clocks of the power-generation maintaining unit 12b and the stator controlling unit 13b have stopped, it is possible to perform communication based on the communication synchronization-purpose clock signal SCLK.

In addition, from the microcomputer 11c, a data selecting signal SERSEL is output into the serial communication IFs 129a and 136b and into controlling terminals of the buffers 141 and 142. In the case where communication is to be performed between the microcomputer 11c and the power-generation maintaining unit 12b, the communication between the microcomputer 11c and the stator controlling unit 13b is blocked. In the case where communication is to be performed between the microcomputer 11c and the stator controlling unit 13b, the communication between the microcomputer 11c and the power-generation maintaining unit 12b is blocked.

With these arrangements, even in the case where a communication path is shared between the power-generation maintaining unit 12b and the stator controlling unit 13b, it is possible to prevent the serial communication IFs 129a and 136b from being driven simultaneously. It is therefore possible to avoid a situation in which the power-generation maintaining unit 12b and the stator controlling unit 13b compete with each other.

Further, in the case where the communication with the stator controlling unit 13b has been permitted according to the data selection signal SERSEL, when microcomputer transmission data TX has been transmitted from the microcomputer 11c, the microcomputer transmission data TX is received via the serial communication IF 136b. Subsequently, stator reception data SRD is generated from the microcomputer transmission data TX by the serial communication IF 136b and is sent to the stator control logic unit 132b.

Further, when stator transmission data STD has been transmitted from the stator control logic unit 132b, microcomputer reception data RX is generated by the serial communication IF 136b and is sent to the microcomputer 11c via the buffer 142.

While communication is performed normally between the serial communication IF 136b and the microcomputer 11c, a stator normal communication detection signal S65 is sent from the serial communication IF 136b to the communication monitoring unit 138.

Further, the communication monitoring unit 138 monitors the intervals at which communication is performed normally with the microcomputer 11c. In the case where the intervals at which communication is performed normally with the microcomputer 11c is too long, a stator communication abnormality signal S66 is output into the stator control logic unit 132b.

In the case where a power-generation instruction or a drive instruction has been transmitted from the microcomputer 11c, the stator gate command signal S14 is generated by the stator control logic unit 132b and is input to the stator driver unit 133.

Further, when the stator power-source abnormality signal S52, the stator logic abnormality signal S64 or the stator communication abnormality signal S66 has been input to the stator control logic unit 132b, the stator gate command signal S14 is generated so as to turn off all of the switching elements T1 to T6.

Further, a case is considered in which the stator power unit abnormality signal S31 has been input to the stator control logic unit 132b. In the case where a short-circuit to the power source or a ground fault has occurred, the stator gate command signal S14 is generated so as to turn off all of the switching elements T1 to T6. In the case where an abnormality has occurred in an individual gate, the stator gate command signal S14 is generated so as to turn off a corresponding one of the switching elements T1 to T6 individually.

Further, a case is considered in which communication with the power-generation maintaining unit 12b has been permitted according to the data selection signal SERSEL. When microcomputer transmission data TX has been transmitted from the microcomputer 11c, the microcomputer transmission data TX is received via the serial communication IF 129a. After that, rotor reception data RRD is generated from the microcomputer transmission data TX by the serial communication IF 129a and is sent to the rotor control logic unit 123.

Further, when rotor transmission data RTD has been transmitted from the rotor control logic unit 123, microcomputer reception data RX is generated by the serial communication IF 129a and is sent to the microcomputer 11c via the buffer 141.

While communication is performed normally between the serial communication IF 129a and the microcomputer 11c, a rotor normal communication detection signal S62 is sent from the serial communication IF 129a to the communication monitoring unit 1214.

Further, the communication monitoring unit 1214 monitors the intervals at which communication is performed normally with the microcomputer 11c. In the case where the intervals at which communication is performed normally with the microcomputer 11c is too long, a rotor communication abnormality signal S63 is output into the reset generating unit 1213.

In the case where the reset generating unit 1213 has received, as an input, the WDT abnormality detection signal S20 or the microcomputer power-source abnormality detection signal S21, the reset signal S12 is output into the microcomputer 11c and into the stator control logic unit 132b. Subsequently, the microcomputer 11c and the stator control logic unit 132b are reset, and also, the setting is switched so that the power-generation process is maintained by the power-generation maintaining unit 12b.

A case is considered in which the rotor communication abnormality signal S63 has been input to the reset generating unit 1213. In the case where normal communication has never been established with the microcomputer 11 after a power-on reset is performed, if neither the WDT abnormality detection signal S20 nor the microcomputer power-source abnormality detection signal S21 has been input, the setting is switched so that the microcomputer 11c and the stator control logic unit 132b exercise the driving control or the power-generation control, without outputting the reset signal S12 into the microcomputer 11c and the stator control logic unit 132b.

While no communication has been established between the power-generation maintaining unit 12b and the microcomputer 11c, to inform the microcomputer 11c that the power-generation maintaining unit 12b has switched the setting so that the microcomputer 11c exercises the driving control or the power-generation control, without outputting the reset signal S12 to the microcomputer 11c, it is possible to perform a synchronized serial communication according to the communication synchronization-purpose clock signal SCLK.

The process of informing the microcomputer 11c as described above may be realized through a logic function with an external port of the microcomputer 11c and an external port of the power-generation maintaining unit 12b. In this situation, an asynchronous serial communication may be performed, instead of the synchronized serial communication.

Further, before the rotor communication abnormality signal S63 is input to the reset generating unit 1213, if normal communication has been established with the microcomputer 11c after a power-on reset is performed, the reset signal S12 is output into the microcomputer 11c and into the stator control logic unit 132b. After that, the microcomputer 11c and the stator control logic unit 132b are reset, and the setting is switched so that the power-generation process is maintained by the power-generation maintaining unit 12b.

Further, to the trip detecting unit 130, the rotor logic abnormality signal S22, the microcomputer abnormality detection signal S23, and the rotor communication abnormality signal S63 are input so that the trip signal S61 is generated.

The conditions under which the trip signal S61 is output include, for example, a situation in which an abnormality has occurred in the clock of the power-generation maintaining unit 12b, and also, the power source of the power-generation maintaining unit 12b is operating normally. Another example of the conditions under which the trip signal S61 is output is a situation in which the power source of the power-generation maintaining unit 12b is operating normally, the clock of the power-generation maintaining unit 12b is operating normally, the watchdog of the microcomputer 11c is operating normally, and also, normal communication has never been established with the microcomputer 11c after a power-on reset is performed.

When one of the conditions as described above is satisfied, it is judged that an abnormality has occurred in the logic function of the power-generation maintaining unit 12b, and the selector unit 126b is thus able to switch the setting so that the microcomputer 11c and the power-generation maintaining unit 12b exercise the driving control or the power-generation control.

FIG. 11 is a table explaining an example of an operation performed by the trip detecting unit shown in FIG. 9. As shown in FIG. 11, when having received, as an input, the rotor logic abnormality signal S22, the trip detecting unit 130 outputs the trip signal S61. Also, even in the case where the rotor logic abnormality signal S22 has not been input to the trip detecting unit 130, if the rotor communication abnormality signal S63 is input thereto, without the microcomputer abnormality detection signal S23 being output, the trip detecting unit 130 outputs the trip signal S61.

Figure 12:
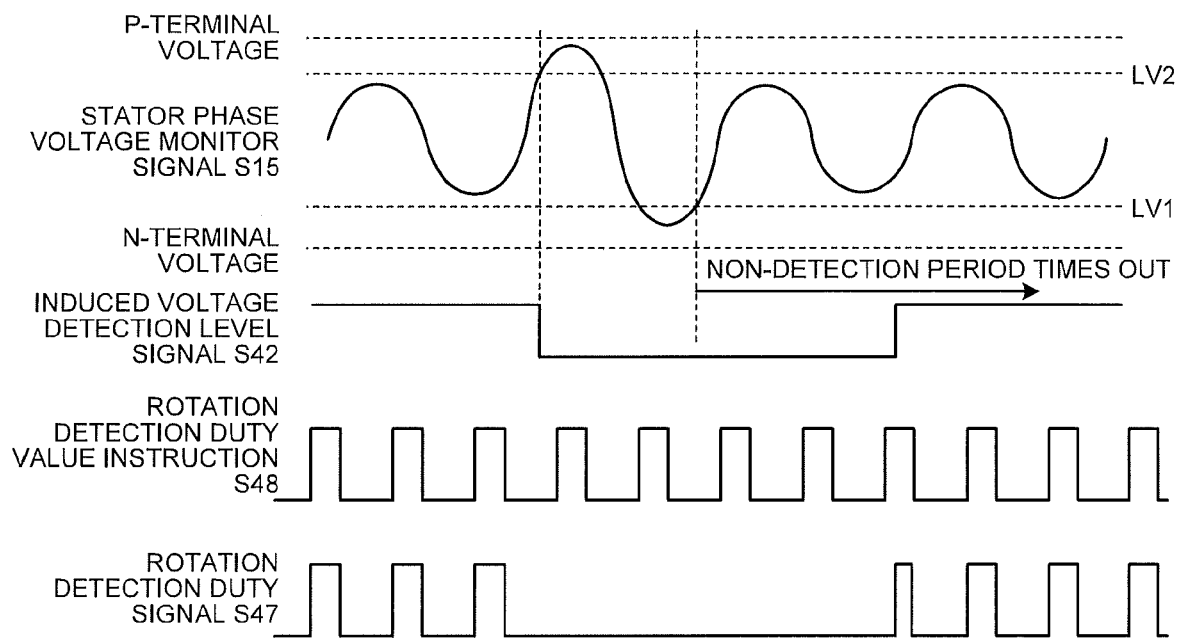
FIG. 12 is a timing chart explaining an example of operations performed by a rotor rotation detecting unit and a rotation detection duty generating unit that are shown in FIG. 9.

FIG. 12 is a timing chart explaining an example of operations performed by the rotor rotation detecting unit 124 and the rotation detection duty generating unit 1231 that are shown in FIG. 9. As shown in FIG. 12, the rotor rotation detecting unit 124 sets voltage detection levels LV1 and LV2. Further, the rotor rotation detecting unit 124 detects rotations of the rotor based on the stator phase voltage monitor signal S15 and also compares the level of the stator phase voltage monitor signal S15 with the voltage detection levels LV1 and LV2. In the case where the level of the stator phase voltage monitor signal S15 goes over or under the voltage detection level LV1 or LV2, a timer is activated every time the level of the stator phase voltage monitor signal S15 goes out of the range. During the period between the point in time when the stator phase voltage monitor signal S15 goes over or under the voltage detection level LV1 or LV2 for the first time and the time when the timer has expired, the induced voltage detection level signal S42 is kept in the state where the signal has been changed from a high level to a low level.

Further, when the rotor rotation detecting unit 124 has detected rotations of the rotor, the rotation detection signal S41 and the induced voltage detection level signal S42 are output into the rotation detection duty generating unit 1231.

Further, when the rotation detection signal S41 has been input to the rotation detection duty generating unit 1231, the rotation detection duty value instruction S48 is generated and is output into the power-generation maintaining duty generating unit 1232. Further, because the rotation detection duty value instruction S48 is stopped while the induced voltage detection level signal S42 is at a low level, the rotation detection duty signal S47 is generated.

Further, to the selector unit 126b, the microcomputer rotor gate signal S26, the microcomputer power-generation/driving switching signal S71, the rotation detection duty signal S47, the power-generation maintaining duty signal S49, the microcomputer abnormality detection signal S23, the rotor power-source abnormality signal S24, the load dump detection signal S50, and the trip signal S61 are input.

Further, in the case where the rotor power-source abnormality signal S24 or the load dump detection signal S50 has been input to the selector unit 126b, the microcomputer rotor gate signal S26 and the power-generation maintaining duty signal S49 are blocked, so that the duty is set to "0" according to the rotor gate command signal S27.

In contrast, in the case where the microcomputer abnormality detection signal S23 has been input while no trip signal is being output, the power-generation maintaining duty signal S49 is input to the logical OR circuit N14 via the logical AND circuit N11.

As another example, in the case where the trip signal S61 has been input while there is no abnormality in the microcomputer, the rotation detection duty signal S47 is input to the logical OR circuit N14 via the logical AND circuit N12.

As yet another example, in the case where a power-generation process has been selected according to the microcomputer power-generation/driving switching signal S71, while there is no abnormality in the microcomputer, and also, no trip signal is being output, the microcomputer rotor gate signal S26 and the rotation detection duty signal S47 are input to the logical OR circuit N14 via the logical AND circuit N18.

As yet another example, in the case where a driving process has been selected according to the microcomputer power-generation/driving switching signal S71, while there is no abnormality in the microcomputer, and also, no trip signal is being output, the microcomputer rotor gate signal S26 is input to the logical OR circuit N14 via the logical AND circuit N13.

As yet another example, in the situation where there is no abnormality in the power source of the rotor, and also, there is no fluctuation in the load that exceeds the presumed level, the output signals from the logical AND circuits N11 to N13 and N18 are output via the logical OR circuit N14, as the rotor gate command signal S27.

In the case where an abnormality has occurred in the rotor, the power-generation-maintaining-unit error handler 1210 outputs a rotor interruption signal S60 into the microcomputer 11c. Further, the microcomputer 11c transmits microcomputer transmission data TX in which an abnormality-purpose register reading request has been set, whereas the power-generation maintaining unit 12a transmits microcomputer reception data RX in which an abnormality-purpose register value has been set.

With these arrangements, the microcomputer 11c is able to perform communication with the power-generation maintaining unit 12b and with the stator controlling unit 13b. Even in the situation where the operation control is exercised over the motor generator unit 14 via the power-generation maintaining unit 12b and the stator controlling unit 13b, separately from the microcomputer 11c, it is possible to detect the operation state of the motor generator unit 14 on the microcomputer 11c side. In addition, even if a failure has occurred in the communication path to and from the microcomputer 11c, it is possible to maintain the power-generation process performed by the motor generator unit 14 via the power-generation maintaining unit 12b.

Further, because the microcomputer power-generation/driving switching signal S71 is supplied to the power-generation maintaining unit 12b, it is possible to accurately detect, on the power-generation maintaining unit 12b side, whether the power-generation process has been selected or the driving process has been selected. As a result, it is possible to blend the rotation detection duty signal S47 into the microcomputer rotor gate signal S26 and to output the blended result as the rotor gate command signal S27. Consequently, because it is possible to keep causing a rotor current of a certain level to flow, separately from the microcomputer 11c, it is possible to maintain the situation where the rotations are being detected.

Figure 13:
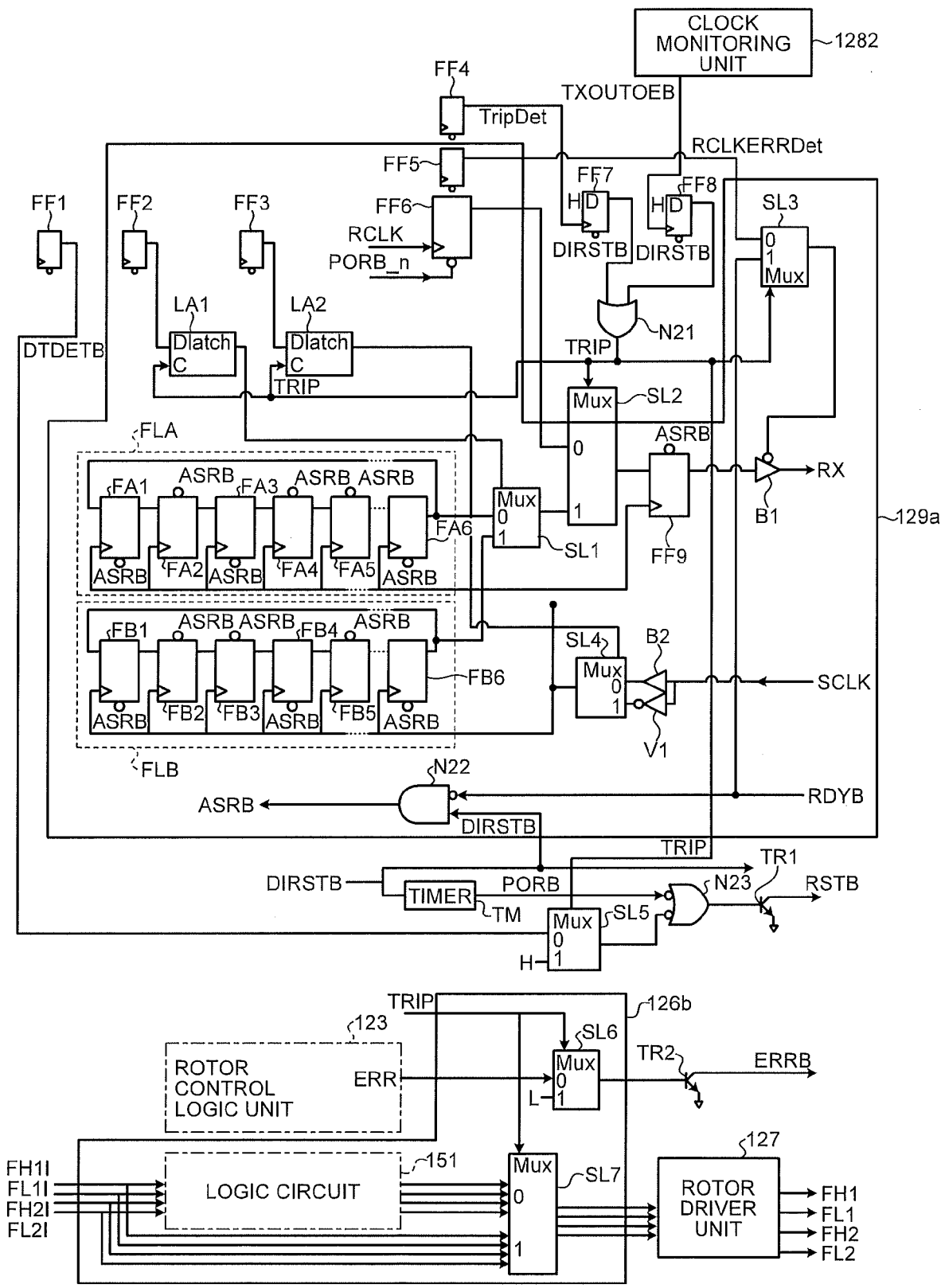
FIG. 13 is a block diagram explaining a circuit mode that makes it possible to perform a synchronized serial communication even while a clock of a power-generation maintaining unit is stopped, in the electric power converting apparatus according to the third embodiment of the present invention.

FIG. 13 is a block diagram explaining a circuit mode that makes it possible to perform a synchronized serial communication even while the clock of the power-generation maintaining unit 12b is stopped, in the electric power converting apparatus according to the third embodiment of the present invention. As shown in FIG. 13, the serial communication IF 129a includes: flip-flop rows FLA and FLB; flip-flops FF2, FF3, and FF9; latch circuits LA1 and LA2; selectors SL1 to SL4; an inverter V1, buffers B1 and B2; and a logical AND circuit N22.

The selector unit 126b includes selectors SL6 and SL7 and a logic circuit 151. The logic circuit 151 is configured so as to be in charge of selecting a signal in the case where none of the trip conditions is satisfied.

The flip-flop rows FLA and FLB include flip-flops FA1 to FAn and flip-flops FB1 to FBn, respectively, while the quantity of the flip-flops in each of the rows is equal to n. The flip-flops FA1 to FAn and the flip-flops FB1 to FBn are connected in a cascade connection mode. The value "n" corresponds to the number of bits obtained by calculating 8 bits=1 bytex"the number of bytes in the transmission frame".

The flip-flop row FLA is able to form a typical flip-flop row, whereas the flip-flop row FLB is able to form an atypical flip-flop row. In this situation, in an atypical flip-flop row, the bits are arranged in a reversed order with respect to the bit order in a typical flip-flop row.

Depending on how the microcomputer 11c is configured, the bit order in a serial communication may be "the Most Significant Bit (MSB) to the Least Significant Bit (LSB)" or may be "the LSB to the MSB". Thus, it is possible to select one of the flip-flop rows FLA and FLB in correspondence with the bit order being used.

It is possible to set, in each of the flip-flop rows FLA and FLB, a typical transmission frame storing therein a predetermined message that allows the microcomputer 11c to detect that a trip has occurred. No matter what kind of read/write is requested, it is possible to recognize that a trip has occurred in the power-generation maintaining unit 12b, as long as the typical transmission frame can be read.

The flip-flop FF1 stores therein a WDT abnormality detection signal DTDETB. The flip-flop FF2 stores therein information that specifies the bit order in the serial communication. Also, the flip-flop FF3 stores therein information that specifies the bit order in the serial communication. Information is stored to specify whether data should be taken in at the rising edge of the communication synchronization-purpose clock signal SCLK or at the trailing edge of the communication synchronization-purpose clock signal SCLK.

The flip-flop FF4 stores therein a trip state signal TripDet. The trip state is a state in which, in the case where a communication failure has occurred between the microcomputer 11c and the power-generation maintaining unit 12b while there is no abnormality in the clocks of the microcomputer 11c and the power-generation maintaining unit 12b, the signal of the rotor control logic unit 123 is considered to be invalid, while the signal of the microcomputer 11c is considered to be valid.

The flip-flop FF5 stores therein a drive enable signal TXOUTOEB from an output buffer storing therein the microcomputer reception data RX.

The trip state signal TripDet that has been output from the flip-flop FF4 is output into the logical OR circuit N21 via the flip-flop FF7. Further, a rotor clock abnormality signal RCLKERRDet that has been output from the clock monitoring unit 1282 is output into the logical OR circuit N21 via the flip-flop FF8.

The logical OR circuit N21 generates a trip signal TRIP by calculating a logical sum of the output signal from the flip-flop FF7 and the output signal from the flip-flop FF8 and outputs the generated trip signal TRIP to the latch circuits LA1 and LA2 and to the selectors SL2, SL3, SL5, SL6, and SL7.

Further, when the trip signal TRIP has been output into the selector SL7, the output from the logic circuit 151 is invalidated, and also, microcomputer rotor gate signals FH1I, FL1I, FH2I, and FL2I are selected and output into the rotor driver unit 127. After that, rotor gate drive signals FH1, FL1, FH2, and FL2 are generated from the microcomputer rotor gate signals FH1I, FL1I, FH2I, and FL2I by the rotor driver unit 127 and are output into the rotor power unit 16.

As a result, in the case where the trip signal TRIP has been issued, it is possible to cause the microcomputer rotor gate signals FH1I, FL1I, FH2I, and FL2I to be output into the rotor power unit 16 by using only the combination circuits such as the AND, OR, and NOT circuits, without going through the circuits that need the clocks.

Consequently, even in the situation where an abnormality has occurred in the clock of the power-generation maintaining unit 12b so that the operations of all the logic circuits in the power-generation maintaining unit 12b are not guaranteed, it is possible to cause the microcomputer 11c to exercise the rotor control, and it is possible to maintain the power-generation process.

With reference to the example shown in FIG. 13, the configuration in which there are four microcomputer rotor gate command signals (i.e., FH1I, FL1I, FH2I, and FL2I) and four rotor gate drive signals (i.e., FH1, FL1, FH2, and FL2) has been explained. In correspondence with this configuration, the rotor power unit 16 shown in FIG. 2 is able to have four switching elements T7 at maximum.

Further, when the trip signal TRIP has been output into the selector SL6, a rotor interruption signal ERR that has been output from the rotor control logic unit 123 is selected, and also, a rotor interruption signal ERRB is output into the microcomputer 11c via a transistor TR2.

Further, a reset signal DIRSTB is input to the logical AND circuit N22, and also, a data selection signal RDYB is inverted and input to the logical AND circuit N22 from the microcomputer 11c. The reset signal DIRSTB is a reset signal that is input to a non-synchronous reset terminal of the flip-flop group included in the logic function of the power-generation maintaining unit 12b.

Further, the logical AND circuit N22 generates a reset signal ASRB that resets an internal logic function of the power-generation maintaining unit 12b by calculating a logical product of the reset signal DIRSTB and the data selection signal RDYB.

Further, a reset signal PORB is generated by delaying the reset signal DIRSBT while using a timer TM and is inverted and input to the logical OR circuit N23. Further, when the trip signal TRIP has been output into the selector SL5, the WDT abnormality detection signal DTDETB is selected and is inverted and input to the logical OR circuit N23.

Further, when an output signal from the logical OR circuit N23 is input to a transistor TR1, a reset signal RSTB is generated and is output into the microcomputer 11c as the reset signal S12.

Further, the communication synchronization-purpose clock signal SLCK is input to the selector SL4 via the buffer B2 and is inverted and input to the selector SL4 via the inverter V1. To the selector SL3, the drive enable signal TXOUTOEB is input, and also, the data selection signal RDYB is input.

To the selector SL2, a clock signal RCLK is input via the flip-flop FF6, and also, an output signal from the selector SL1 is input. The clock signal RCLK is a basic clock that is generated by the clock generating unit 1281 and is used for causing the logic function of the power-generation maintaining unit 12b to operate.

Further, when the trip signal TRIP has been output into the latch circuits LA1 and LA2 and into the selectors SL1 to SL4, one of the flip-flop rows FLA and FLB is selected according to the output from the flip-flop FF2, and also, whether the data should be taken in at the rising edge or at the trailing edge is selected according to the output from the flip-flop FF3. Thus, one of the flip-flop rows FLA and FLB is selected, so that a typical transmission frame is output into the flip-flop FF9 via the selectors SL1 and SL2 sequentially.

After that, the flip-flop FF9 sends the typical transmission frame to the buffer B1 according to the communication synchronization-purpose clock signal SCLK, so that the typical transmission frame is output into the microcomputer 11c via the buffer B1, as microcomputer reception data RX.

With this arrangement, even in the situation where the clock of the power-generation maintaining unit 12b has stopped, it is possible to send the typical communication message in the abnormal situation to the microcomputer 11c, according to the communication synchronization-purpose clock signal SLCK. Consequently, even in the situation where communication is not established between the power-generation maintaining unit 12b and the microcomputer 11c, as long as the communication synchronization-purpose clock signal SCLK issued by the microcomputer 11c is normal, it is possible to inform the microcomputer 11c that the microcomputer rotor gate signals FH1I, FL1I, FH2I, and FL2I have been selected as the rotor gate command signal S27, without the power-generation maintaining unit 12b having to issue a reset signal for the microcomputer 11c.

Figure 14:
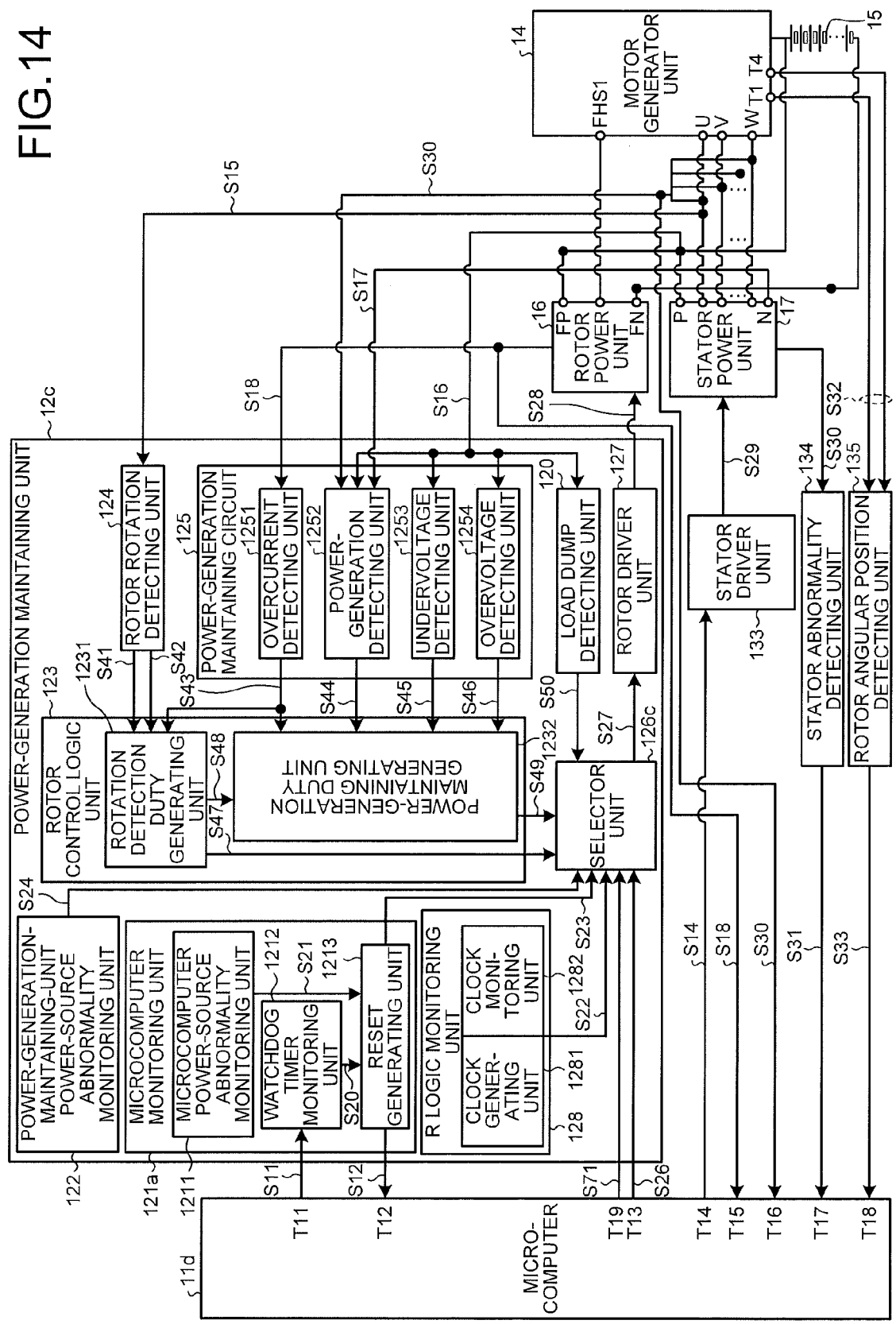
FIG. 14 is a schematic block diagram of an electric power converting apparatus according to a fourth embodiment of the present invention.

FIG. 14 is a schematic block diagram of an electric power converting apparatus according to a fourth embodiment of the present invention. As shown in FIG. 14, the electric power converting apparatus includes a microcomputer 11d and a power-generation maintaining unit 12c, instead of the microcomputer 11a and the power-generation maintaining unit 12a shown in FIG. 1.

In addition to the configuration of the microcomputer 11a, the microcomputer 11d includes a port output terminal T19 from which the microcomputer power-generation/driving switching signal S71 is output. The power-generation maintaining unit 12c includes a selector unit 126c, instead of the selector unit 126a shown in FIG. 1. To the selector unit 126c, the microcomputer power-generation/driving switching signal S71 is input, in addition to the signals that are input to the selector unit 126a.

Figure 15:
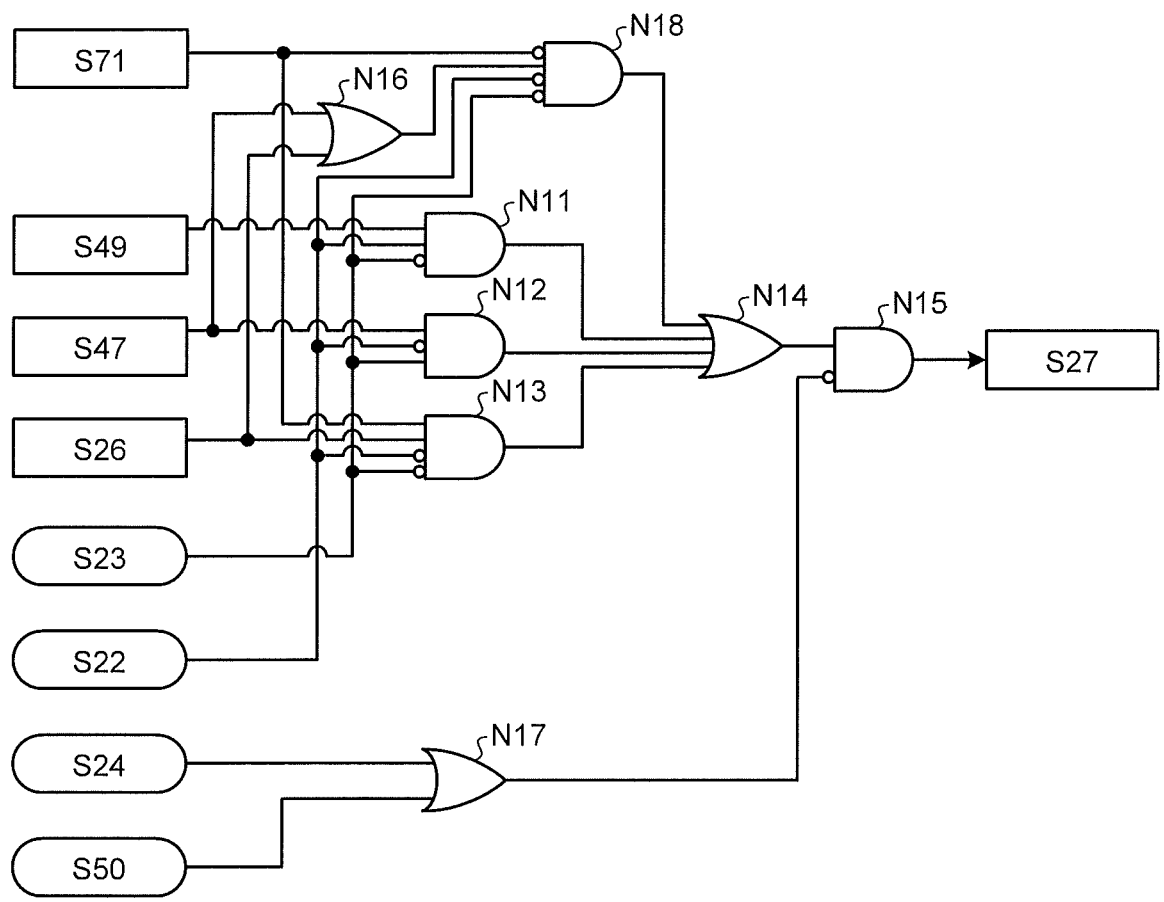
FIG. 15 is a schematic block diagram of a selector unit shown in FIG. 14.

FIG. 15 is a schematic block diagram of the selector unit 126c shown in FIG. 14. As shown in FIG. 15, the selector unit 126c is configured so as to be the same as the selector unit 126b shown in FIG. 9, except that the rotor logic abnormality signal S22 is used, instead of the trip signal S61 used by the selector unit 126b shown in FIG. 9.

Further, in the case where the rotor power-source abnormality signal S24 or the load dump detection signal S50 has been input to the selector unit 126c, the microcomputer rotor gate signal S26 and the power-generation maintaining duty signal S49 are blocked so that the duty is set to "0" according to the rotor gate command signal S27.

In contrast, in the case where the microcomputer abnormality detection signal S23 has been input while the rotor logic abnormality signal S22 is not being input, the power-generation maintaining duty signal S49 is input to the logical OR circuit N14 via the logical AND circuit N11.

As another example, in the case where the rotor logic abnormality signal S22 is input while there is no abnormality in the microcomputer, the rotation detection duty signal S47 is input to the logical OR circuit N14 via the logical AND circuit N12.

As yet another example, in the case where a power-generation process has been selected according to the microcomputer power-generation/driving switching signal S71 while there is no abnormality in the microcomputer, and also, the rotor logic abnormality signal S22 is not being input, the microcomputer rotor gate signal S26 and the rotation detection duty signal S47 are input to the logical OR circuit N14 via the logical AND circuit N18.

As yet another example, in the case where a driving process has been selected according to the microcomputer power-generation/driving switching signal S71, while there is no abnormality in the microcomputer, and also, the rotor logic abnormality signal S22 is not being output, the microcomputer rotor gate signal S26 is input to the logical OR circuit N14 via the logical AND circuit N13.

As yet another example, in the situation where there is no abnormality in the power source of the rotor, and also, there is no fluctuation in the load that exceeds the presumed level, the output signals from the logical AND circuits N11 to N13 and N18 are output via the logical OR circuit N14, as the rotor gate command signal S27.

With these arrangements, it is possible to blend the rotation detection duty signal S47 into the microcomputer rotor gate signal S26 and to output the blended result as the rotor gate command signal S27. Consequently, because it is possible to keep causing a rotor current of a certain level to flow, separately from the microcomputer 11c, it is possible to maintain the situation where the rotations are being detected.

Figure 16:
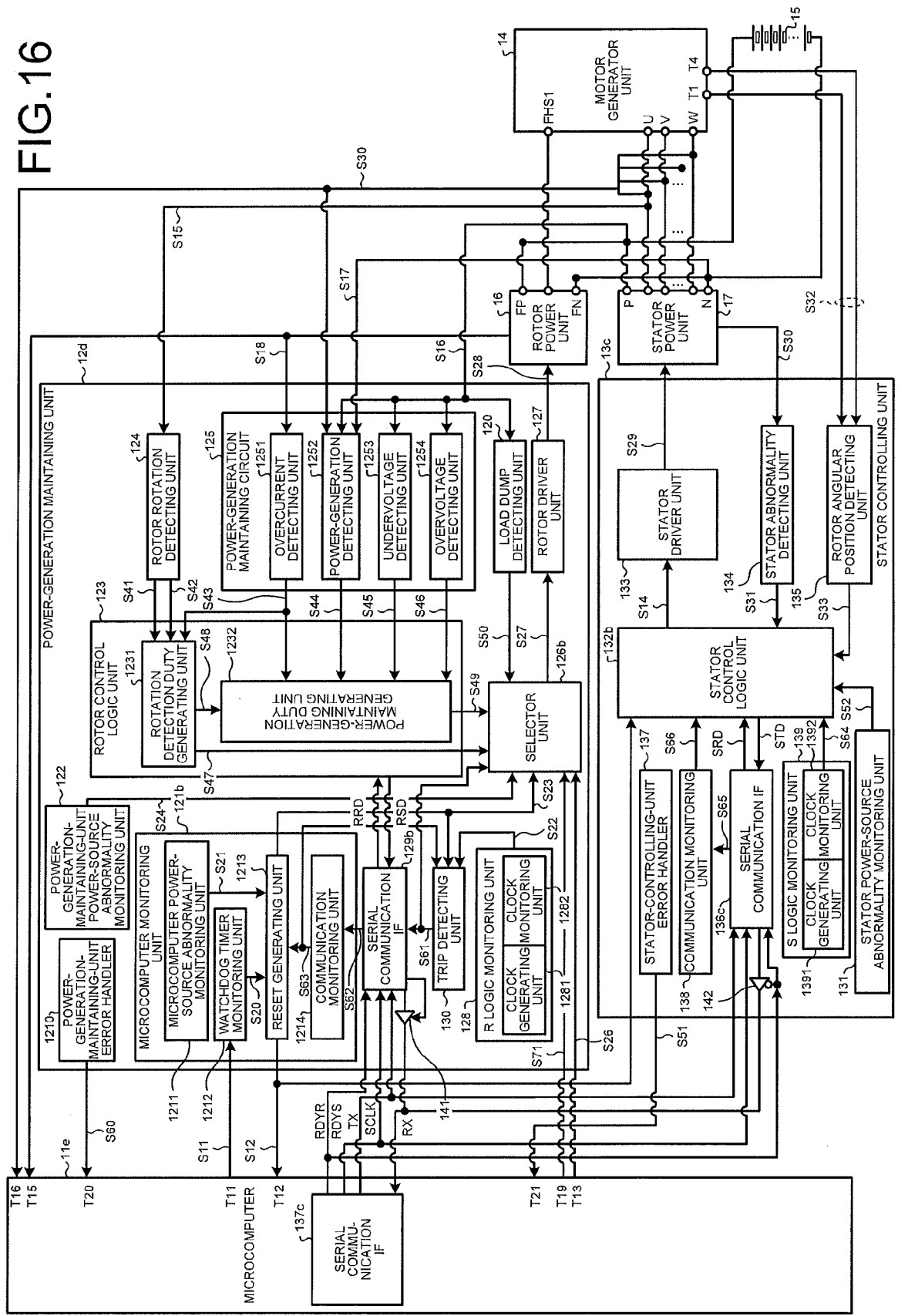
FIG. 16 is a schematic block diagram of an electric power converting apparatus according to a fifth embodiment of the present invention.

FIG. 16 is a schematic block diagram of an electric power converting apparatus according to a fifth embodiment of the present invention. As shown in FIG. 16, the electric power converting apparatus includes a microcomputer 11e, a power-generation maintaining unit 12d, and a stator controlling unit 13c, instead of the microcomputer 11c, the power-generation maintaining unit 12b, and the stator controlling unit 13b that are shown in FIG. 9.

The microcomputer 11e includes a serial communication IF 137c, instead of the serial communication IF 137b shown in FIG. 9. The power-generation maintaining unit 12d includes a serial communication IF 129b, instead of the serial communication IF 129a shown in FIG. 9. The stator controlling unit 13c includes a serial communication IF 136c instead of the serial communication IF 136b shown in FIG. 9.

In this situation, a party with which the microcomputer 11e communicates needs to be selected. In the electric power converting apparatus shown in FIG. 9, the data selection signal SERSEL is input to the power-generation maintaining unit 12b and to the stator controlling unit 13b from the microcomputer 11c; however, in the electric power converting apparatus shown in FIG. 16, a rotor communication ready signal RDYR is input to the power-generation maintaining unit 12d from the microcomputer 11e, whereas a stator communication ready signal RDYS is input to the stator controlling unit 13c from the microcomputer 11e.

Figure 17:
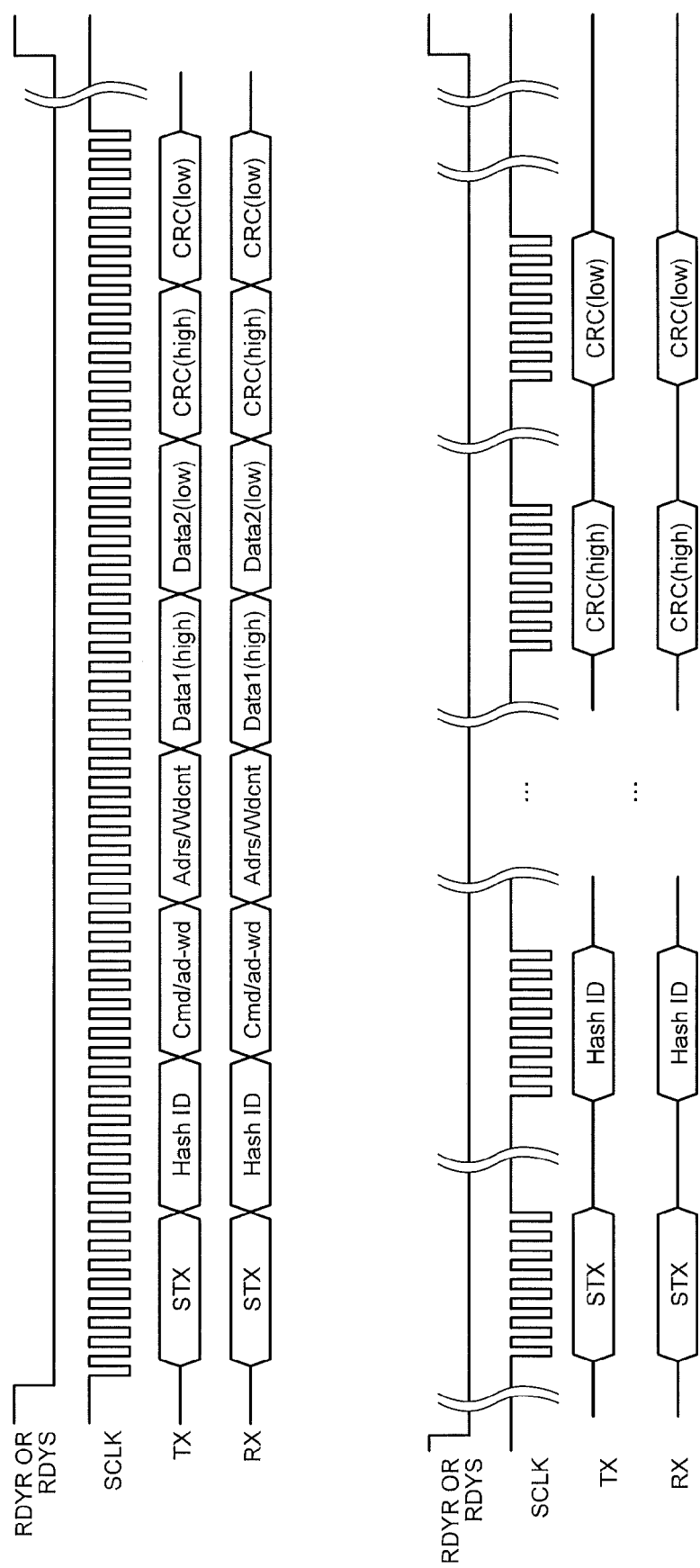
FIG. 17 is a timing chart explaining an example of a serial communication process performed by the electric power converting apparatus shown in FIG. 16.

FIG. 17 is a timing chart explaining an example of a serial communication process performed by the electric power converting apparatus shown in FIG. 16. As shown in FIG. 17, when communication is to be performed between the microcomputer 11e and the power-generation maintaining unit 12d, the rotor communication ready signal RDYR is changed to a low level. In contrast, when communication is to be performed between the microcomputer 11e and the stator controlling unit 13c, the stator communication ready signal RDYS is changed to a low level.

Further, in synchronization with the communication synchronization-purpose clock signal SCLK issued by the microcomputer 11e, microcomputer transmission data TX is sent from the microcomputer 11e to the power-generation maintaining unit 12d or to the stator controlling unit 13c.

Further, in synchronization with the communication synchronization-purpose clock signal SCLK issued by the microcomputer 11e, microcomputer reception data RX is sent from the power-generation maintaining unit 12d or from the stator controlling unit 13c to the microcomputer 11e.

STX, a Hash ID, Cmd/ad-wd, Adrs/Wdcnt, and CRC may be configured into the microcomputer transmission data TX and the microcomputer reception data RX, in addition to communication data "Data".

STX is a field in which a static code indicating the beginning of the transmission frame is stored. In Cmd, it is possible to set a command of a read request or a write request.

It is possible to put a Hash ID into a request frame or a response frame. For example, the power-generation maintaining unit 12d and the stator controlling unit 13c put the hash ID that has been stored in the request frame from the microcomputer 11e into a response frame as it is and returns the response frame to the microcomputer 11e. As a result, the microcomputer 11e is able to easily detect a correspondence relationship between the request frame and the response frame.

By using ad-wd and Adrs/Wdcnt, it is possible to specify an address at which reading or writing is requested. The specification of the address may correspond to a plurality of words. By using wd and Wdcnt, it is possible to specify the number of words with which the transmission frame is constituted.

By using Cyclic Redundancy Check (CRC), it is possible to append an error detection code such as CCITT16 used for detecting bit errors in a range from the first word to the last word in the transmission frame.

In this situation, by using the rotor communication ready signal RDYR and the stator communication ready signal RDYS for the purpose of selecting the party with which the microcomputer 11e communicates, it is possible to make the completion of the communication frame definite. Thus, even in the situation where a failure has occurred (e.g., the communication frames become out of synchronization) due to a noise on the communication path or the like, it is possible to re-detect the beginning portion of the communication data by raising and lowering the rotor communication ready signal RDYR and the stator communication ready signal RDYS. Consequently, it is possible to improve resistance against failures in the serial communication.

In the exemplary embodiments described above, the method for providing the power-generation maintaining function, the rotation detection function, the load dump function, the power-source abnormality monitoring function, the overcurrent detection function, the overvoltage detection function, and the communication function, separately from the microcomputer that exercises the driving control and the power-generation control over the motor generator has been explained; however, the method for combining two or more of these functions is not limited to the examples described in the exemplary embodiments. It is possible to select any arbitrary combinations.

According to an aspect of the present invention, an advantageous affect is achieved where it is possible to improve the reliability level of the power-generation operation control, while reducing the load of the processing performed by the microcomputer.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electric power converting apparatus, comprising:
a microcomputer that, based on a rotor current and stator phase voltages of a motor generator, exercises driving control and power-generation control over the motor generator; and
a power generation maintaining unit that allows the microcomputer to exercise the power-generation control while the microcomputer is operating normally and maintains the power-generation process performed by the motor generator, in an autonomous manner independently of the microcomputer when an abnormality occurs in the microcomputer, wherein
the power-generation maintaining unit, independent of the microcomputer, monitors fluctuations in a load based on a stator bus voltage and blocks a rotor current in the motor generator based on a result of monitored fluctuations in the load.

2. The electric power converting apparatus according to claim 1, wherein
the power-generation maintaining unit monitors itself, and in a case where an abnormality has occurred in the power-generation maintaining unit, the power-generation maintaining unit allows the microcomputer to exercise the power-generation control.

3. The electric power converting apparatus according to claim 1, wherein
the power-generation maintaining unit includes:
a rotor rotation detecting unit that, based on a result of monitoring on a stator phase voltage, detects rotations of a rotor included in the motor generator; and
a rotation detection duty generating unit that, based on a result of the detection of the rotations of the rotor, maintains the rotations of the rotor.

4. The electric power converting apparatus according to claim 1, wherein the power-generation maintaining unit includes a serial communication interface that transmits information indicating an operation state of the rotor to the microcomputer.

5. An electric power converting apparatus, comprising:
a microcomputer that, based on a rotor current and stator phase voltages of a motor generator, exercises driving control and power-generation control over the motor generator; and
a power generation maintaining unit that, separately from the power-generation control exercised by the microcomputer, maintains a power-generation process performed by the motor generator, wherein the power-generation maintaining unit includes:
a power-generation maintaining circuit that monitors a power-generation state of the motor generator based on the stator phase voltages of the motor generator; and
a power-generation maintaining duty generating unit that, based on a result of the monitoring on the power-generation state performed by the power-generation maintaining circuit, controls a duty so that the power-generation process performed by the motor generator is maintained.

6. The electric power converting apparatus according to claim 5, wherein in a case where an overvoltage has been detected during the power-generation process performed by the motor generator, the power-generation maintaining duty generating unit controls the duty so that rotations of the motor generator are maintained.

7. The electric power converting apparatus according to claim 5, wherein
the power-generation maintaining circuit includes:
an overcurrent detecting unit that detects an overcurrent based on a result of monitoring on the rotor current;
a power-generation detecting unit that detects the power-generation process performed by the motor generator, based on results of monitoring on the rotor current, the stator bus voltage, and the stator phase voltages;
an undervoltage detecting unit that detects an undervoltage, based on a result of monitoring on the stator bus voltage; and
an overvoltage detecting unit that detects an overvoltage, based on a result of monitoring on the stator bus voltage, and in a case where an undervoltage has been detected, the power-generation maintaining circuit raises the duty so that the power-generation process performed by the motor generator is maintained, whereas in a case where an overvoltage has been detected, the power-generation maintaining circuit lowers the duty so that rotations of the motor generator are maintained, and in a case where an overcurrent has been detected, the power-generation maintaining circuit turns off a switching element that drives a rotor.

8. The electric power converting apparatus according to claim 5, wherein the microcomputer exercises driving control over a stator, based on a result of detecting an angular position of a rotor.

9. The electric power converting apparatus according to claim 5, further comprising a stator controlling unit that exercises driving control over a stator, based on a result of detecting an angular position of a rotor.

10. The electric power converting apparatus according to claim 9, wherein the microcomputer performs communication with the power-generation maintaining unit and the stator controlling unit so as to detect an operation state of the motor generator.

11. An electric power converting apparatus, comprising:
a microcomputer that, based on a rotor current and stator phase voltages of a motor generator, exercises driving control and power-generation control over the motor generator; and
a power generation maintaining unit that, separately from the power-generation control exercised by the microcomputer, maintains a power-generation process performed by the motor generator, wherein
the power-generation maintaining unit includes a load dump detecting unit that, based on a stator bus voltage, monitors fluctuations in a load, independently of the microcomputer, and
the power-generation maintaining unit blocks the rotor current of the motor generator, based on a result of the monitoring on the fluctuations in the load performed by the load dump detecting unit.

12. An electric power converting apparatus, comprising:
a microcomputer that, based on a rotor current and stator phase voltages of a motor generator, exercises driving control and power-generation control over the motor generator; and
a power generation maintaining unit that, separately from the power-generation control exercised by the microcomputer, maintains a power-generation process performed by the motor generator, wherein the power-generation maintaining unit includes:
a microcomputer monitoring unit that monitors operations of the microcomputer;
a rotor clock monitoring unit that monitors a clock used for an operation performed by the power-generation maintaining unit; and
a selector unit that switches signals so that, in a case where an abnormality has occurred in the microcomputer monitored by the microcomputer monitoring unit, a rotor included in the motor generator is controlled by the power-generation maintaining unit, whereas in a case where an abnormality has occurred in the clock monitored by the clock monitoring unit, the rotor included in the motor generator is controlled by the microcomputer.

13. An electric power converting apparatus, comprising:
a microcomputer that, based on a rotor current and stator phase voltages of a motor generator, exercises driving control and power-generation control over the motor generator;
a power generation maintaining unit that, separately from the power-generation control exercised by the microcomputer, maintains a power-generation process performed by the motor generator;
and a stator controlling unit that exercises driving control over a stator, based on a result of detecting an angular position of a rotor, wherein
the microcomputer performs communication with the power-generation maintaining unit and the stator controlling unit so as to detect an operation state of the motor generator, and
in a case where normal communication has never been established with the microcomputer after a power-on reset is performed, if no abnormality is detected in the microcomputer, the power-generation maintaining unit switches a setting so that driving control or power-generation control is exercised over the motor generator by the microcomputer and the power-generation maintaining unit.

14. An electric power converting apparatus, comprising:
a microcomputer that, based on a rotor current and stator phase voltages of a motor generator, exercises driving control and power-generation control over the motor generator;
a power generation maintaining unit that, separately from the power-generation control exercised by the microcomputer, maintains a power-generation process performed by the motor generator;
and a stator controlling unit that exercises driving control over a stator, based on a result of detecting an angular position of a rotor, wherein
the microcomputer performs communication with the power-generation maintaining unit and the stator controlling unit so as to detect an operation state of the motor generator, and
in a case where, when a communication failure has been detected in communication with the microcomputer and normal communication has been established with the microcomputer after a power-on reset is performed, the power-generation maintaining unit switches a setting so that the power-generation maintaining unit exercises power-generation control over the motor generator.

15. An electric power converting apparatus, comprising:
a microcomputer that, based on a rotor current and stator phase voltages of a motor generator, exercises driving control and power-generation control over the motor generator;
a power generation maintaining unit that, separately from the power-generation control exercised by the microcomputer, maintains a power-generation process performed by the motor generator;
and a stator controlling unit that exercises driving control over a stator, based on a result of detecting an angular position of a rotor, wherein
the stator controlling unit includes:
a rotor angular position detecting unit that detects an angular position of the rotor;
a stator abnormality detecting unit that detects abnormalities in the stator based on a result of monitoring on stator phase voltages;
a stator control logic unit that exercises driving control over the stator, based on a result of the detection of the angular position of the rotor and a result of the detection of the abnormalities in the stator; and
a first serial communication interface that receives an operation instruction from the microcomputer and transmits information indicating an operation state of the stator to the microcomputer.

16. The electric power converting apparatus according to claim 15, wherein
the stator controlling unit includes a stator clock monitoring unit that monitors a clock used for an operation performed by the stator controlling unit, and
in a case where an abnormality has occurred in the clock monitored by the stator clock monitoring unit, the stator control logic unit stops the driving control exercised over the stator.

17. An electric power converting apparatus, comprising:
a microcomputer that, based on a rotor current and stator phase voltages of a motor generator, exercises driving control and power-generation control over the motor generator;
a power generation maintaining unit that, separately from the power-generation control exercised by the microcomputer, maintains a power-generation process performed by the motor generator,
wherein when a setting has been switched so that driving control is exercised over the motor generator by the microcomputer, the power-generation maintaining unit allows the microcomputer to exercise the driving control, whereas when a setting has been switched so that power-generation control is exercised over the motor generator by the microcomputer, the power-generation maintaining unit either allows the microcomputer to exercise the power-generation control or allows the power-generation maintaining unit itself to maintain the power-generation process performed by the motor generator.

18. An electric power converting apparatus comprising:
a microcomputer that, based on a rotor current and stator phase voltages of a motor generator, exercises driving control and power-generation control over the motor generator;
a load dump detecting unit that, based on a stator bus voltage, monitors fluctuations in a load, independently of the microcomputer; and
a selector unit that, based on a result of the monitoring on the fluctuations in the load performed by the load dump detecting unit, blocks a rotor gate command signal that controls the rotor current.

19. An electric power converting apparatus comprising:
a microcomputer that, based on a rotor current and stator phase voltages of a motor generator, exercises driving control and power-generation control over the motor generator; and
a rotor control logic unit that allows the microcomputer to control rotations of the motor generator while the microcomputer is operation normally and maintains rotations of the motor generator, in an autonomous manner independently of the microcomputer when an abnormality occurs in the microcomputer, wherein
the rotor control unit blocks, independently of the microcomputer, a rotor current in the motor generator based on fluctuations in a load, which are obtained by monitoring a stator bus voltage.

* * * * *